United States Patent
Gorretta et al.

(10) Patent No.: US 10,250,950 B2
(45) Date of Patent: Apr. 2, 2019

(54) METHOD AND DEVICE FOR DETERMINING REDRESS MEASURES FOR TV SERVICE OUTAGES BASED ON IMPACT ANALYSIS

(71) Applicant: Synamedia Limited, Middlesex (GB)

(72) Inventors: Steven Carl Gorretta, Portland, OR (US); Steven Jason Epstein, Hashmoniam (IL); Marcelo Blatt, Modiin (IL); Ezra Darshan, Beit Shemesh (IL)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

(21) Appl. No.: 15/628,321

(22) Filed: Jun. 20, 2017

(65) Prior Publication Data

US 2018/0192157 A1    Jul. 5, 2018

Related U.S. Application Data

(60) Provisional application No. 62/441,823, filed on Jan. 3, 2017.

(51) Int. Cl.
| | |
|---|---|
| *H04N 21/658* | (2011.01) |
| *H04N 21/258* | (2011.01) |
| *H04N 21/442* | (2011.01) |
| *H04N 21/84* | (2011.01) |
| *G06Q 30/00* | (2012.01) |
| *H04H 20/12* | (2008.01) |
| *H04H 60/33* | (2008.01) |

(Continued)

(52) U.S. Cl.
CPC ......... *H04N 21/6582* (2013.01); *G06Q 30/00* (2013.01); *H04H 20/12* (2013.01); *H04H 60/33* (2013.01); *H04H 60/66* (2013.01); *H04N 21/25891* (2013.01); *H04N 21/442* (2013.01); *H04N 21/84* (2013.01); *G06Q 30/0225* (2013.01); *H04N 21/222* (2013.01); *H04N 21/4126* (2013.01); *H04N 21/4222* (2013.01)

(58) Field of Classification Search
CPC ......... H04N 21/6582; H04N 21/25891; H04N 21/442; H04N 21/84; H04N 21/222; H04N 21/4126; H04N 21/4222
See application file for complete search history.

(56) References Cited

U.S. PATENT DOCUMENTS

| | | | |
|---|---|---|---|
| 6,070,073 A | 5/2000 | Maveddat et al. | |
| 6,177,931 B1 * | 1/2001 | Alexander | G06Q 30/0269 348/565 |

(Continued)

*Primary Examiner* — Hunter B Lonsberry
(74) *Attorney, Agent, or Firm* — Fernando & Partners, LLP; Ying Li

(57) ABSTRACT

Techniques for use in determining redress measures for a television (TV) service outage based on impact analysis are described. A TV service outage may be associated with a TV system apparatus including a TV user interface (UI). In one illustrative example, one or more subscribers impacted by the TV service outage are determined. An impact score is determined for each one of the subscribers. A redress measure for each one of the subscribers is then determined in accordance with their corresponding impact scores. An impacted subscriber and/or an impact score may be determined based at least in part on subscriber TV usage data or subscriber TV UI usage data.

18 Claims, 22 Drawing Sheets

(51) Int. Cl.
  *H04H 60/66* (2008.01)
  *H04N 21/222* (2011.01)
  *H04N 21/422* (2011.01)
  *H04N 21/41* (2011.01)
  *G06Q 30/02* (2012.01)

(56) References Cited

U.S. PATENT DOCUMENTS

| | | | |
|---|---|---|---|
| 7,690,013 B1 * | 3/2010 | Eldering | G06Q 30/02 |
| | | | 725/32 |
| 8,006,275 B1 | 8/2011 | Poole et al. | |
| 8,810,421 B2 | 8/2014 | Deaver, Sr. et al. | |
| 9,356,829 B1 * | 5/2016 | Zeldin | H04L 43/00 |
| 2016/0335652 A1 * | 11/2016 | Chang | G06Q 30/0215 |

* cited by examiner

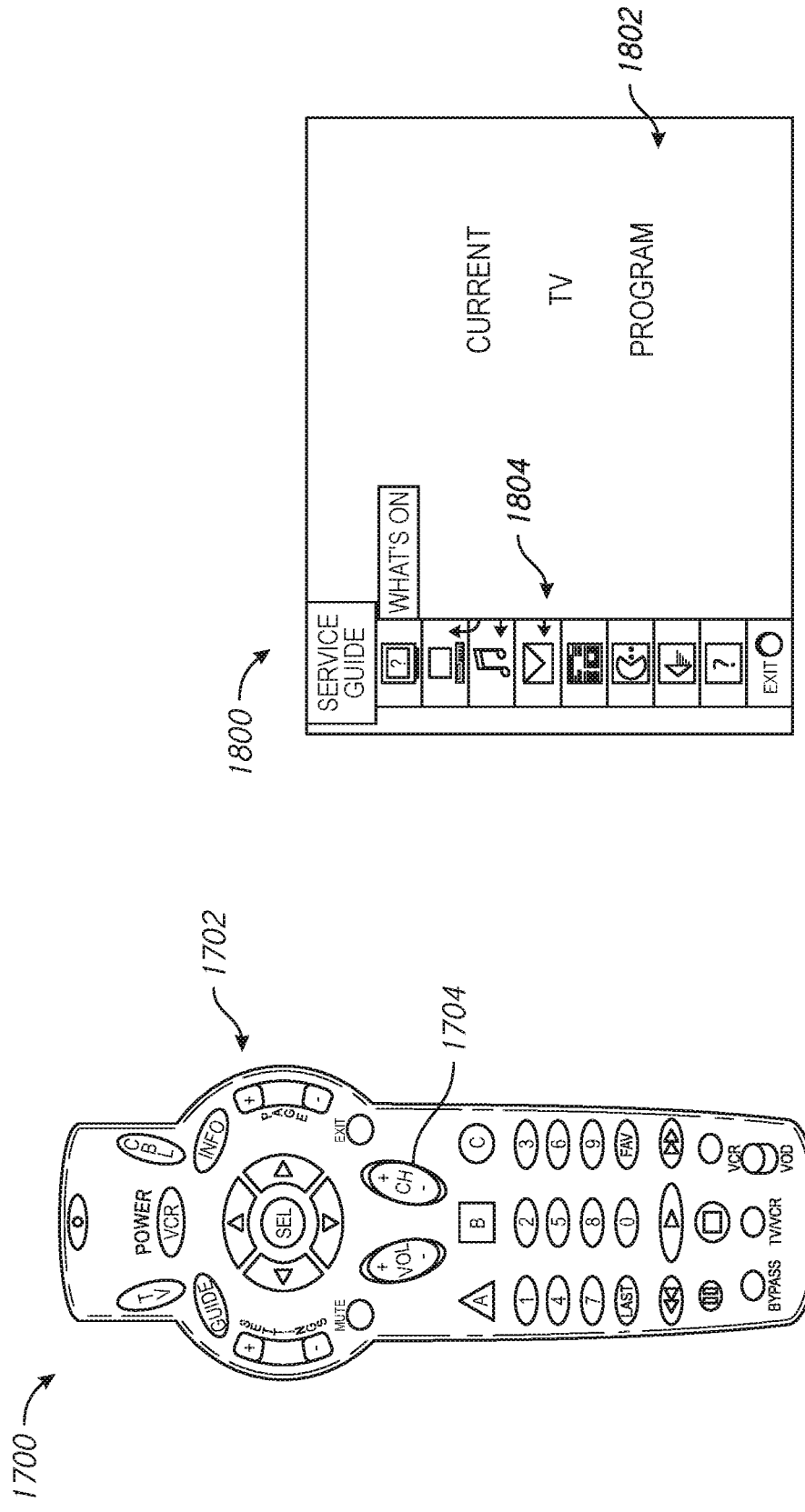

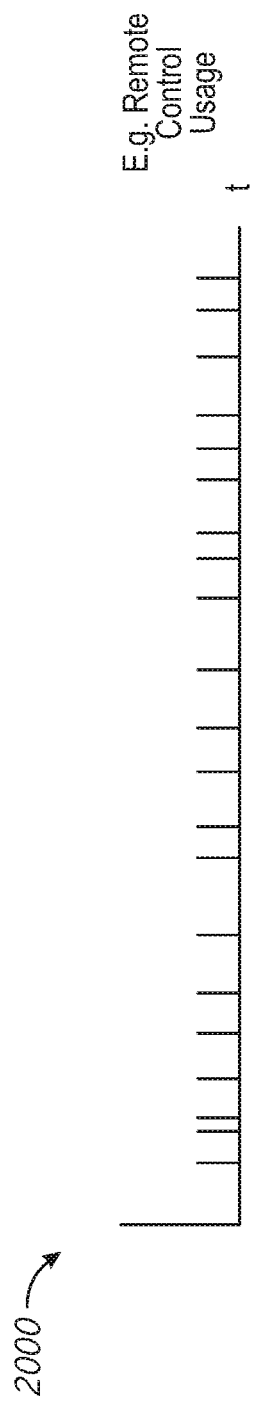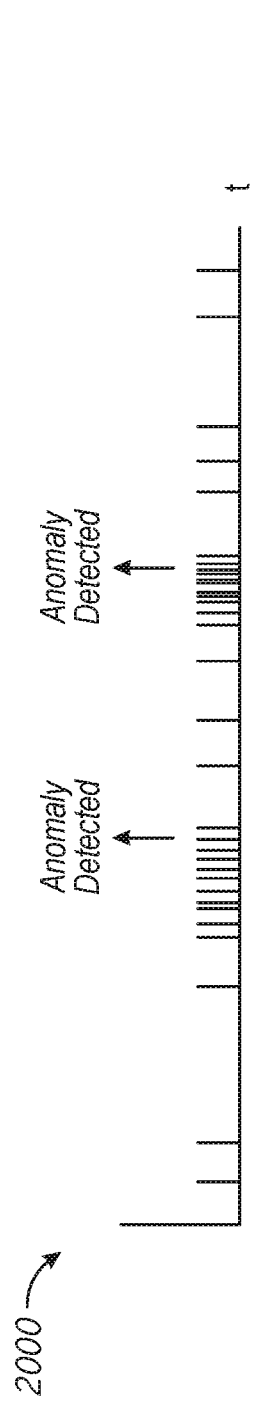
FIG. 20A
FIG. 20B
FIG. 20C

US 10,250,950 B2

METHOD AND DEVICE FOR DETERMINING REDRESS MEASURES FOR TV SERVICE OUTAGES BASED ON IMPACT ANALYSIS

CROSS-REFERENCE TO RELATED APPLICATION

This application claims the benefit of U.S. Provisional Patent Application No. 62/441,823, filed on Jan. 3, 2017, the contents of which are hereby incorporated by reference for all purposes.

TECHNICAL FIELD

The present disclosure relates generally to determining redress measures for service outages, such as television (TV) service outages.

BACKGROUND

When a subscriber to a service provider (SP) experiences a television (TV) service outage (e.g., down TV or Internet service) due to a network or other problem, today's mechanism for redressing the situation is very basic. For example, the subscriber calls their SP, explains what they experienced, and, if the subscriber qualifies, receives a service credit.

This is a frustrating experience in that, not only did the subscriber experience a service outage, but the subscriber also initiates the remediation process with their SP. In addition, the subscriber may have to call the SP a number of different times to get through due to the large number of calls received during an outage. On the other hand, other subscribers that were not actually impacted by the outage may call to receive unwarranted service credits. The service person is often unaware of any problem encountered by the subscriber and has very limited means for validation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 17 is an illustrative example of a TV user interface (UI) comprising a remote control;

FIG. 18 is an illustrative example of a TV user interface (UI) comprising a remote control presentation in a visual display of a computer device;

FIGS. 20A-20C show illustrative graphs of subscriber TV service usages indicated by a plurality of timeframe descriptors for two different subscribers;

Figure 1:
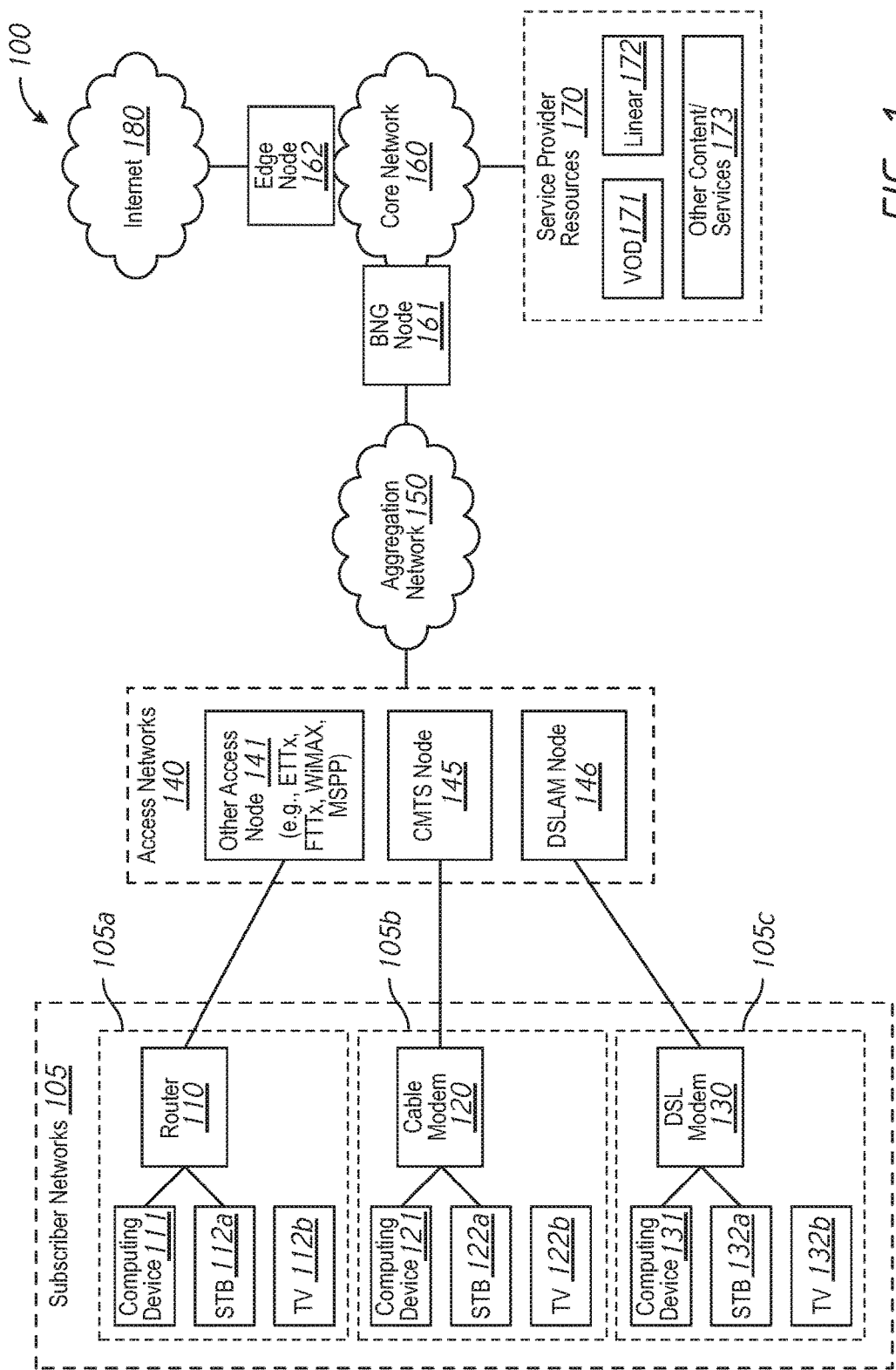
FIG. 1 is a block diagram of an example service provider (SP) access topology in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in determining redress measures for a television (TV) service outage based on subscriber impact analysis are described herein.

A TV service may be offered via a TV system apparatus having a TV user interface (UI). In one illustrative example, one or more subscribers impacted by a TV service outage are determined. An impact score is determined for each one of the subscribers. A redress measure for each one of the subscribers is determined based on their corresponding impact scores. An impacted subscriber and/or an impact score of the impacted subscriber may be determined based at least in part on subscriber TV or TV UI usage data. A message with an offer to provide the redress measure may be automatically generated and sent to a subscriber.

In some implementations, user and entity behavior analysis (UEBA) is used to identify subscribers affected by an outage and/or to infer the degree to which those subscribers were affected.

In some implementations, an impacted subscriber or impact score for the impacted subscriber may be determined by comparing predetermined TV usage data (e.g. known or historical TV usage of the subscriber or subscriber population) with unavailable service description data associated with the TV service outage, generating one or more correlation values corresponding to one or more correlations between the predetermined TV usage data and the unavailable service description data associated with the TV service outage; and determining the impact score as a function of the one or more correlation values. Here, an inference or likelihood determination may be made as to whether the subscriber was actually impacted by the TV service outage and/or to what extent.

In some implementations, the one or more impacted subscribers or the impact score for an impacted subscriber may be determined by maintaining access to a plurality of stored importance values, where a stored importance value has a stored association with one of a plurality of timeframe or content descriptors for offered TV content; identifying one or more timeframe or content descriptors associated with a time period of or content offered during the TV service outage; selecting one or more of a plurality of stored importance values that are associated with the identified one or more timeframe or content descriptors of the TV service outage; and determining the one or more impacted subscribers or the impact score based on the selected one or more stored importance values. The stored importance value for a timeframe or content descriptor may be (pre)determined based on at least one of one or more subscriber preferences or likes; one or more subscriber profile types; one or more popularity indicators; a predetermined TV usage pattern; a TV usage pattern of a sample subscriber population; and a TV usage pattern of the subscriber. Here, again, an inference or likelihood determination may be made as to whether the subscriber was actually impacted by the TV service outage and/or to what extent.

In some implementations, an impacted subscriber and/or impact score for the impacted subscriber may be determined based at least in part on detecting an anomaly between predetermined TV UI usage behavior data and detected subscriber TV UI usage behavior data during the TV service outage. The technique may involve comparing a predetermined TV UI usage pattern (e.g. known, normal UI behavior) with a TV UI usage pattern of the subscriber over at least a portion of the TV service outage, and identifying one or more deviations between the predetermined TV UI usage pattern and the TV UI usage pattern of the subscriber. Here, an inference or likelihood determination may be made as to whether the subscriber was actually impacted (e.g. bothered or upset) by the TV service outage and/or to what extent.

In other techniques, for each one of one or more subscribers of a TV offered via a TV system apparatus having a TV UI, it is determined whether an anomaly exists between predetermined TV UI usage behavior data (e.g. known, normal UI behavior) and detected subscriber TV UI usage behavior data of the subscriber. A TV service outage for the subscriber is identified based at least in part on determining that the anomaly exists.

In yet other techniques, for each one of one or more subscribers of a TV service offered via a TV system apparatus having a TV UI, it is monitored whether an anomaly exists between predetermined TV UI usage behavior data (e.g. known, normal UI behavior) and detected subscriber TV UI usage behavior data of a subscriber. A TV service outage is identified based at least in part on determining that the anomaly exists for at least a threshold number of subscribers. A geographic region of the TV service outage may be identified based at least in part on a plurality of subscriber locations of the threshold number of subscribers.

Many related and other techniques and implementations are described further below.

Example Embodiments

As described above, when a subscriber to a service provider (SP) experiences a television (TV) service outage (e.g., down TV or Internet service) due to a network or other problem, today's mechanism for remedying the situation is very basic. For example, the subscriber calls their SP, explains what they experienced, and, if the subscriber qualifies, receives a service credit.

This is a frustrating experience in that, not only did the subscriber experience a service outage, but the subscriber also initiates the remediation process with their SP. In addition, the subscriber may have to call the SP a number of different times to get through due to the large number of calls received during an outage. On the other hand, other subscribers that were not actually impacted by the outage may call to receive unwarranted service credits. The service person is often unaware of any problem encountered by the subscriber and has very limited means for validation.

There is a need for advancing and improving devices, networks, and techniques utilized in the above-described environment, as well as advancing and improving devices, networks, and techniques associated with other similar or even unrelated environments.

Techniques of the present disclosure may be for use by a service provider (SP) of a television (TV) service, for example, an SP of a cable TV service, a satellite TV service, and/or an Internet TV service. In some implementations, the techniques of the present disclosure may be used to determine: (a) what the outage involved; (b) when the outage occurred; (c) what was the cause of the outage (d) who was impacted by the outage; and (e) proportional remedy based on the impact of the outage.

By way of simple example, outage A occurs at 3 pm on a Monday for 20 minutes on 5 cable networks with a minimal impact to viewership and no live content being disrupted, and outage B occurs at 6 pm on a Sunday for 45 minutes impacting all local channels in 3 major markets with a high impact on viewership of a live football broadcast. Techniques of the present disclosure may determine, using past history, data coming from various components of service provider network, feedback from the endpoints associated with the subscribers, feedback from the subscribers themselves, and financial factors, that: (a) example outage A does not require much if any service credit to impacted users; and (b) example outage B would result in a service credit in varying size depending on what users were watching TV at the time of the outage, the duration of the outage, the amount the subscriber was bothered by the outage, how meaningful or important was the timeframe or content to the subscriber or subscriber population in general, by number of viewers in the household, and other factors.

According to some implementations, the redress measure is selected to take these factors into account, as well as the importance of that subscriber to the SP. The redress measure may also be selected to take into account the number of (e.g. close-in-time) outages experienced by the subscriber (e.g. the larger the number, the greater value of the redress measure). The technique then recommends a redress measure and, if enabled by the SP, processes and notifies the end users of the redress measure. Thus, the SP may initiate offers for redress measures to subscribers responsive to a service outage instead of merely responding to incoming calls from subscribers. In some implementations, the result is tuned based on a machine learning algorithm that takes in customer feedback from these "outage campaigns" and balances customer satisfaction with financial impact. As a result, SPs can take an outage incident and turn it into a loyalty-building initiative by initiating and personalizing the response, matching the proper remedy with the impact of the outage. The reputation of a SP can be negatively impacted when services go down, and having customers call in to request a credit makes it worse. This solution allows SPs to quicken the remediation process, increase customer satisfaction, and potentially introduce new services (e.g., a video-on-demand (VOD) credit).

FIG. 1 is a block diagram of an example service provider (SP) access topology 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the SP access topology 100 includes subscriber networks 105, access networks 140, an aggregation network 150, a core network 160, SP resources 170, and the Internet 180. As will be appreciated by one of ordinary skill in the art, the SP access topology 100 shown in FIG. 1 is merely an example topology, and, in other various implementations, the topology may be changed or rearranged.

According to some implementations, the SP access topology 100 corresponds to a SP that provides services/utilities to subscribers such as video-on-demand (VOD) content, linear television (TV) content, broadcast TV content, Internet access, voice-over-IP (VOIP), and/or the like. As shown in FIG. 1, the core network 160 is communicatively coupled (e.g., via a wired or wireless connection) to the Internet 180 via edge node 162. As shown in FIG. 1, the core network 160 is communicatively coupled (e.g., via a wired or wireless connection) to the aggregation network 150 via a broad network gateway (BNG) node 161. According to some implementations, the BNG node 161 aggregates subscriber sessions from the access networks 140. According to some implementations, the BNG node 161 provides policy management functionality and manages quality of service (QoS). As shown in FIG. 1, the core network 160 is communicatively coupled (e.g., via a wired or wireless connection) to SP resources 170 including VOD content 171, linear content 172, and other content/services 173.

As shown in FIG. 1, the aggregation network 150 is communicatively coupled (e.g., via a wired or wireless connection) to access networks 140. As shown in FIG. 1, the access networks 140 include other access node 141 (e.g., Ethernet-to-the-X (ETTx, where x could be premises, node, distribution point, curb, etc.), Fibre-to-the-X (FTTx, where x could be premises, node, distribution point, curb, etc.), WiMAX, multiservice provisioning platform (MSPP), and/or the like), a cable modem termination system (CMTS) node 145, and/or a digital subscriber line access multiplexer (DSLAM) node 146. According to some implementations, the SP provides one or more of the aforementioned access modalities, for example, only cable or digital subscriber line (DSL) access.

As shown in FIG. 1, the subscriber networks 105 correspond to subscriber-side networks with associated subscriber premises equipment (CPE). As one example, the other access node 141 is communicatively coupled (e.g., via a wired or wireless connection) to the subscriber network 105a that includes a router 110, a computing device 111 (e.g., a laptop computer, desktop computer, over-the-top (OTT) box, tablet computing device, mobile phone, and/or the like), and a set-top box (STB) 112a with an associated TV 112b. According to some implementations, the subscriber network 105a includes additional networking devices (not shown) such as access points, routers, switches, hubs, and/or the like.

As another example, the CMTS node 145 is communicatively coupled (e.g., via a wired or wireless connection) to the subscriber network 105b that includes a cable modem 120, a computing device 121 (e.g., a laptop computer, desktop computer, OTT box, tablet computing device, mobile phone, and/or the like), and an STB 122a with an associated TV 122b. According to some implementations, the subscriber network 105b includes additional networking devices (not shown) such as access points, routers, switches, hubs, and/or the like.

As yet another example, the DSLAM node 146 is communicatively coupled (e.g., via a wired or wireless connection) to the subscriber network 105c that includes a DSL modem 130, a computing device 131 (e.g., a laptop computer, desktop computer, OTT box, tablet computing device, mobile phone, and/or the like), and an STB 132a with an associated TV 132b. According to some implementations, the subscriber network 105c includes additional networking devices (not shown) such as access points, routers, switches, hubs, and/or the like. As will be appreciated by one of ordinary skill in the art, the subscriber networks 105 shown in FIG. 1 are merely exemplary with an arbitrary number of associated devices, and, in other various implementations, the subscriber networks 105 may include more or less associated devices (e.g., additional computing devices and/or STBs with associated TVs).

Figure 2:
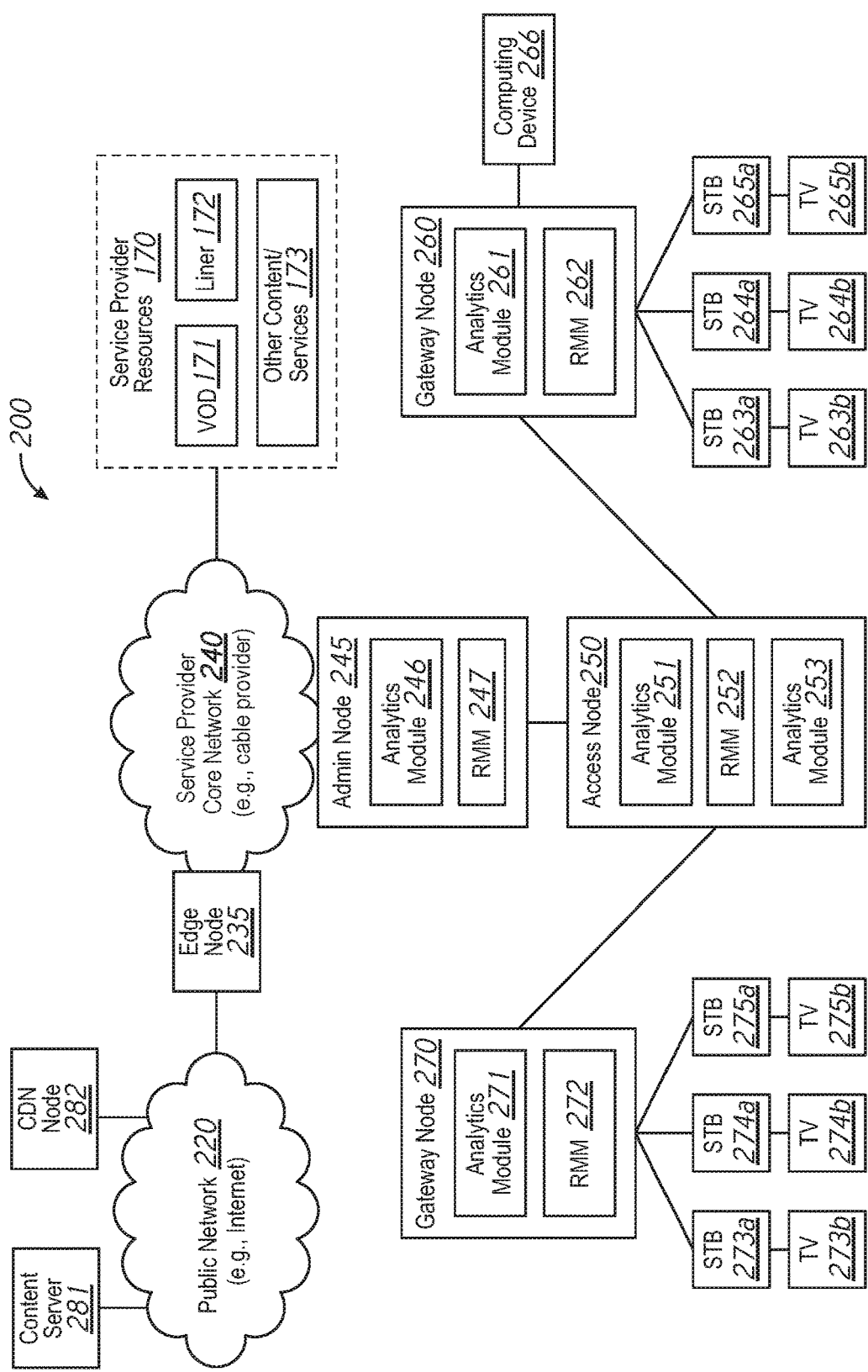
FIG. 2 is a block diagram of a data communication environment in accordance with some implementations.

FIG. 2 is a block diagram of a data communication environment 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 200 includes: a public network 220 (e.g., a portion of the Internet), a service provider core network 240 (hereinafter the "core network 240"), service provider (SP) resources 170, an administration (admin) node 245, and an access node 250.

As shown in FIG. 2, the data communication environment 200 also includes subscriber gateway nodes 260, 270 and a number of subscriber devices 263a/b, 264a/b, 265a/b, 266, 273a/b, 274a/b, and 275a/b. For example, the subscriber devices 263a, 264a, 265a, 273a, 274a, and 275a correspond to set-top boxes (STBs), and the subscriber devices 263b, 264b, 265b, 273b, 274b, and 275b correspond to television (TV) sets. As one example, the computing device 266 corresponds to a laptop computer, desktop computer, over-the-top (OTT) box, tablet computing device, mobile phone, or the like. In some implementations, the access node 250 is similar to and adapted from the CMTS node 145 or the DSLAM node 146 in FIG. 1. In some implementations, the gateway nodes 260, 270 are similar to and adapted from the cable modem 120 or the DSL modem 130 in FIG. 1.

In some implementations, the core network 240 includes a private and/or subscription-based network. The core network 240 includes any local area network (LAN) and/or wide area network (WAN) such as an intranet, an extranet, a virtual private network, and/or portions of the Internet. In some implementations, the core network 240 provides communication capability between any one of the subscriber devices 263a/b, 264a/b, 265a/b, 266, 273a/b, 274a/b, and 275a/b and one or more third party service providers and/or content providers (e.g., the content server 281, the content delivery network (CDN) node 282, etc.). In some implementations, the core network 240 provides communication capability between any one of the subscriber devices 263a/b, 264a/b, 265a/b, 266, 273a/b, 274a/b, and 275a/b and the public network 220 and the SP resources 170 including VOD content 171, linear content 172, and other content/services 173. In various implementations, the core network 240 includes a combination of computing devices, switches, routers, server systems, enterprise memory, data connections, and/or the like.

In some implementations, the core network 240 uses HTTP (hypertext transport protocol) to transport information using the TCP/IP (transmission control protocol/Internet protocol) suite. HTTP permits client devices to access various resources available via the core network 240 and/or the public network 220. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure.

As shown in FIG. 2, in some implementations, the core network 240 includes an edge node 235 that provides an interface for data communication external to the core network 240 (e.g., to the public network 220, the content server 281, the CDN node 282, etc.). In some implementations, the edge node 235 is provided as a single entity (e.g., a server, a virtual machine, etc.). In some implementations, the edge node 235 is implemented as a distributed system including a suitable combination of software, data structures, virtual machines, computing devices, servers, switches, and/or routers. For the sake of brevity and convenience of explanation, the edge node 235 is described herein as a single entity.

The core network 240 also includes a network administration node 245 (or the like), which is arranged to monitor and/or manage one or more access/headend nodes. Similar to the edge node 235, the network administration node 245 is illustrated as single entity (e.g., a server, a virtual machine, etc.) in FIG. 2. In various implementations, however, the network administration node 245 is provided as a distributed system including a suitable combination of software, data structures, virtual machines, computing devices, servers, switches, and/or routers. Accordingly, the network administration node 245 is described herein as a single entity merely for the sake of brevity and convenience of explanation.

In some implementations, the network administration node 245 includes at least one of an analytics module 246 and a resource management module (RMM) 247. According to some implementations, the analytics module 246 is provided to monitor service usage by subscribers and collect associated data. According to some implementations, the RMM 247 is configured to manage access and network resources.

The access node 250 is coupled to the network administration node 245 and/or one or more other portions of the core network 240. In some implementations, the access node 250 is capable of data communication using the public network 220 and/or other private networks (not shown). Those of ordinary skill in the art will appreciate that, according to some implementations, the access node 245 is typically configured to deliver cable television (TV), cable modem services, and/or various other data services to subscriber client devices. To that end, an access node 250 (e.g., a headend node) includes a suitable combination of software, data structures, virtual machines, routers, switches, and high-availability servers. For example, the access node 250 includes an access module 253 (e.g., a cable modem termination system (CMTS)) that is used to service an allocation of bandwidth shared by a number of client devices. The access module 253 includes a suitable combination of hardware, software, and/or firmware for terminating one or more data channels associated with a number of client devices within the shared allocation of bandwidth.

In some implementations, the access node 250 includes at least one of an analytics module 251 and an RMM 252. According to some implementations, the analytics module 251 is provided to monitor service usage by subscribers and collect associated data. Analytics may be collected in each endpoint as well. According to some implementations, the RMM 252 is configured to manage access and network resources. Further, while the analytics module 251 and the RMM 252 are shown as distinct modules, in some implementations, some or all of the functions of each are incorporated into the access module 253 or the like.

In some implementations, the subscriber devices 263a/b, 264a/b, 265a/b, 266, 273a/b, 274a/b, and 275a/b access network resources, services, and content offerings from a respective access/headend node through subscriber gateway nodes. For example, as shown in FIG. 2, the subscriber gateway nodes 260, 270 are coupled to the access node 250, and thus share bandwidth (and/or other resources) available through the access node 250. In various implementations, a subscriber gateway node includes, without limitation, devices such as cable modems (CMs), routers, wireless access points, Ethernet modems, or the like.

Each of the subscriber gateway nodes 260, 270 is accessible by and services a number of subscriber devices. For example, the subscriber gateway node 260 is coupled to and delivers services and/or content to the subscriber devices 263a/b, 264a/b, 265a/b, and 266. Similarly, the subscriber gateway node 270 is coupled to and delivers services and/or content to the subscriber devices 273a/b, 274a/b, and 275a/b. Those of ordinary skill in the art will appreciate from the present disclosure that, in various implementations, an access/headend node can be connected to any number and combination of subscriber gateway nodes and subscriber devices, and FIG. 2 is merely an example provided to discuss aspects of various implementations.

In some implementations, the subscriber gateway nodes 260, 270 are configured to manage access and/or assist in the management of network resources available to corresponding subscriber devices. To that end, for example, the subscriber gateway node 260 includes an analytics module 261 and an RMM 262. In the example shown in FIG. 2, the analytics module 261 and an RMM 262 are provided, individually or in combination, to manage access or assist in the management of network resources available to subscriber devices 263a/b, 264a/b, 265a/b, and 266.

Similarly, the subscriber gateway node 270 includes an analytics module 271 and an RMM 272. In the example shown in FIG. 2, the analytics module 271 and an RMM 272 are provided, individually or in combination, to manage access or assist in the management of network resources available to subscriber devices 273a/b, 274a/b, and 275a/b. In some implementations, each of the analytics modules 261, 271 and the RMMs 262, 272 include one or more respective functions of the corresponding the analytics modules 246, 251 and the resource management modules 247, 252 discussed above.

With continued reference to FIG. 2, the content server 281 is configured to store and provide media content data, for example, to the subscriber devices 263a/b, 264a/b, 265a/b, 266, 273a/b, 274a/b, and 275a/b. To that end, the content server 281 typically includes a non-transitory memory, one or more processing units (CPUs), an input-output (I/O) interface, and a network interface. The network interface is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface includes input devices, such as but not limited to, a keyboard, mouse, scanner, microphone, etc. The I/O interface may also include output devices, such as but not limited to, a display, speakers, etc. According to some implementations, the CDN node 282 caches media content data provided by the content server 281.

Figure 3:
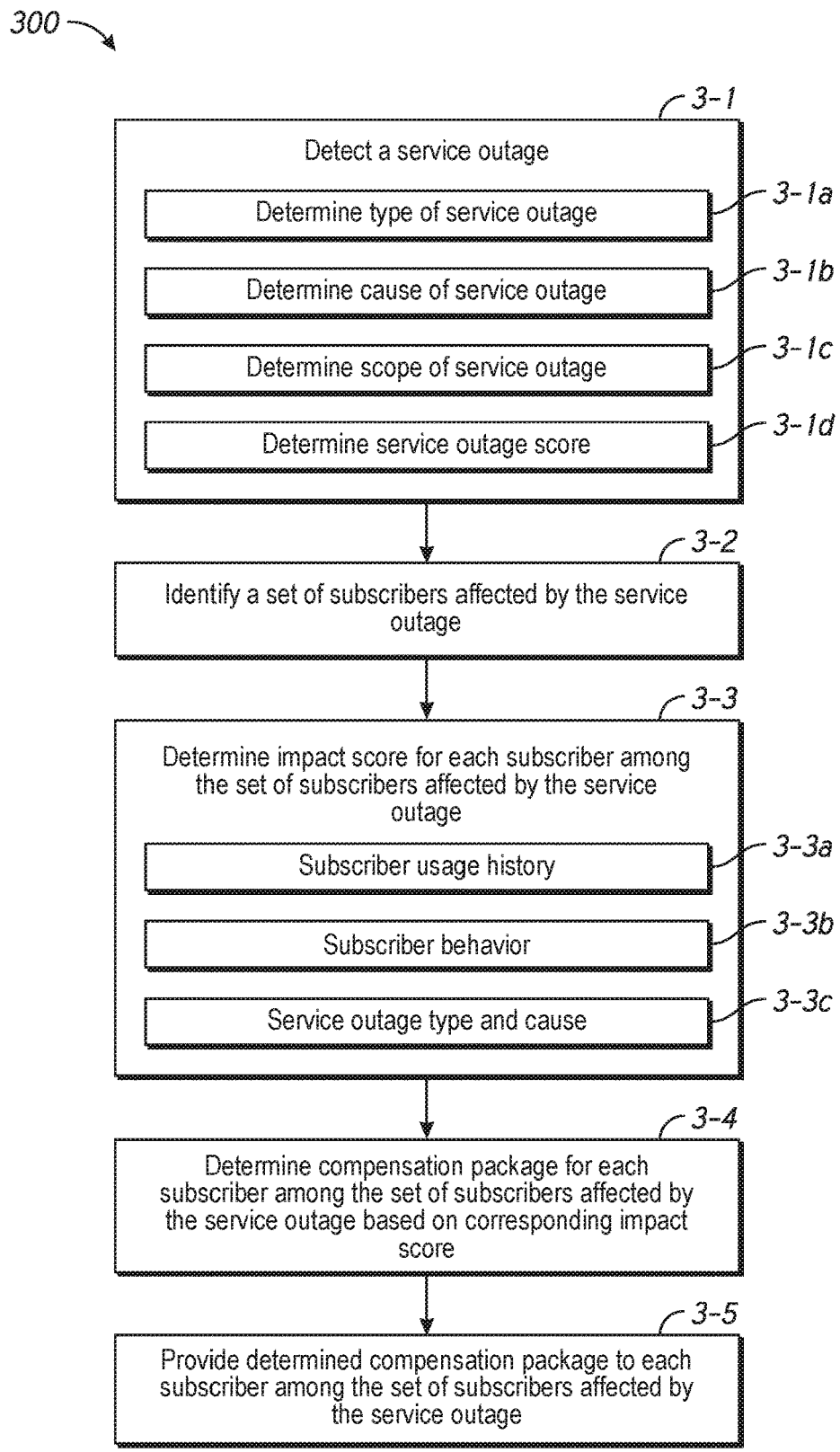
FIG. 3 is a flowchart representation of a method of determining redress measures for a television (TV) service outage based on subscriber impact analysis in accordance with some implementations.

FIG. 3 is a flowchart representation of a method 300 of determining redress measures for a TV service outage based on subscriber impact analysis in accordance with some implementations. In various implementations, the method 300 is performed by a device with one or more processors and non-transitory memory such as the administration node 245 or the access node 250 in FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory).

To that end, as represented by block 3-1, the method 300 includes detecting a service outage. In some implementations, the device or a component thereof (e.g., the administration node 245 or the access node 250 in FIG. 2) detects a service outage based on data coming from various components of the SP network, feedback from the endpoints associated with the subscribers, feedback from the subscribers themselves, and/or the like.

In some implementations, as represented by block 3-1a, detecting the service outage includes determining the type of service outage. For example, the type of service outage corresponds to one or more cable TV networks, one or more local broadcast TV channels, Internet service, and/or the like.

In some implementations, as represented by block 3-1b, detecting the service outage includes determining the cause of the service outage. For example, the cause of the service corresponds to dysfunctional distribution equipment (e.g., SP equipment), dysfunctional subscriber premises equipment (CPE), rain fade or other weather phenomena, downed cables or connections, excess congestion, and/or the like.

In some implementations, as represented by block 3-1c, detecting the service outage includes determining the scope of the service outage. For example, the scope of the service outage corresponds to a geographic area, time period, and/or the like.

In some implementations, as represented by block 3-1d, detecting the service outage includes determining a service outage score. A service outage score may define or characterize (e.g. objectively) whether an outage occurred and likely caused a lack of TV service to a particular geography or a particular subscriber. A service outage score may indicate a confidence level as to the certainty of the outage, the scope of the outage, and/or subscriber equipment involved. In some implementations, the device or a component thereof (e.g., the administration node 245 or the access node 250 in FIG. 2) determines a score for the service outage based on the cause of the service outage, scope of the service outage, type of service outage, and/or the like. For example, a TV outage in a large city which is a major market may be scored (much) higher than a TV outage in a small town with minimal viewership.

As represented by block 3-2, the method 300 includes identifying a set of subscribers affected by the service outage. In some implementations, the device or a component thereof (e.g., the administration node 245 or the access node 250 in FIG. 2) identifies a set of subscribers affected by the service outage such as all subscriber accounts serviced by a specific access node experiencing a service outage.

As represented by block 3-3, the method 300 includes determining an impact score for each subscriber among the set of subscribers affected by the service outage. An impact score for a subscriber may define or characterize (e.g. subjectively) how much or to what extent the affected subscriber was impacted; for example, based on the subscriber's reaction or what content was missed due to the outage. In some implementations, the device or a component thereof (e.g., the administration node 245 or the access node 250 in FIG. 2) determines a per-subscriber impact score based on the service outage score, past history for the subscriber, data coming from various components of SP network, feedback from the endpoints associated with the subscribers, feedback from the subscribers themselves, financial factors, and/or the like. Various ways of determining impact scores are described further herein, especially in relation to FIGS. 5-20.

In some implementations, as represented by block 3-3a, the impact score for a respective subscriber among the set of subscribers affected by the service outage is based at least in part on historical usage data associated with the respective subscriber or subscriber population. For example, a subscriber who experiences a service outage during the airtime of a TV program that they watch every week is more impacted, and, thus, may have a higher impact score than another subscriber who experiences a service outage during a time which they do not typically watch TV. As another example, a subscriber who experiences a service outage during primetime hours (e.g. as opposed to the middle of the night) may more impacted. Again, various approaches of determining impact scores are described further herein, especially in relation to FIGS. 5-20.

In some implementations, as represented by block 3-3b, the impact score for a respective subscriber among the set of subscribers affected by the service outage is based at least in part on behavior associated with the respective subscriber. For example, a subscriber who attempts to reboot his/her cable modem multiple times during a TV outage is more impacted, and, thus, may have a higher impact score, than another subscriber who simply leaves his/her cable modem off during a TV outage. As another example, a subscriber who makes telephonic, email, or other inquires during a service outage is more impacted, and, thus, may have a higher impact score, than another subscriber who makes no such inquiries. Abnormal or excessive use of the TV user interface (UI) may also be indicative of subscriber impact. Again, such different ways of determining impact scores are described further herein, especially in relation to FIGS. 17-23.

In some implementations, as represented by block 3-3c, the impact score for a respective subscriber among the set of subscribers affected by the service outage is based at least in part on characteristics associated with the service outage such as the type and/or cause of the service outage. For example, a subscriber who experiences a total TV outage may be more impacted and thus, have a higher impact score, than another subscriber who experiences outage of a single TV channel (unless for example the single TV channel is the favorite TV channel of the other subscriber). As another example, a subscriber who experiences a service outage that is due to the fault of the SP (e.g., dysfunctional distribution equipment) may have a higher impact score than another subscriber who experiences a service outage due to the fault of dysfunctional CPE or a force majeure such as a solar flare, act of war, catastrophic weather phenomenon, or the like.

As represented by block 3-4, the method 300 includes determining a redress measure for each subscriber among the set of subscribers affected by the service outage based at least in part on their corresponding impact scores. The redress measure may also be determined or tailored based on the number of (e.g. close-in-time) outages experienced by the subscriber (e.g. the larger the number, the greater value of the redress measure). In some implementations, the device or a component thereof (e.g., the administration node 245 or the access node 250 in FIG. 2) determines a per-subscriber redress measure (e.g., pro rata credit on next month's bill, VOD credit, gift card, and/or the like) commensurate with their corresponding impact scores determine in block 3-3.

As represented by block 3-5, the method 300 includes providing the determined redress measure to each subscriber among the set of subscribers affected by the service outage. In some implementations, the device or a component thereof (e.g., the administration node 245 or the access node 250 in FIG. 2) provides the determined redress measure to each subscriber via email, post, telephone, SMS, and/or the like.

Figure 4:
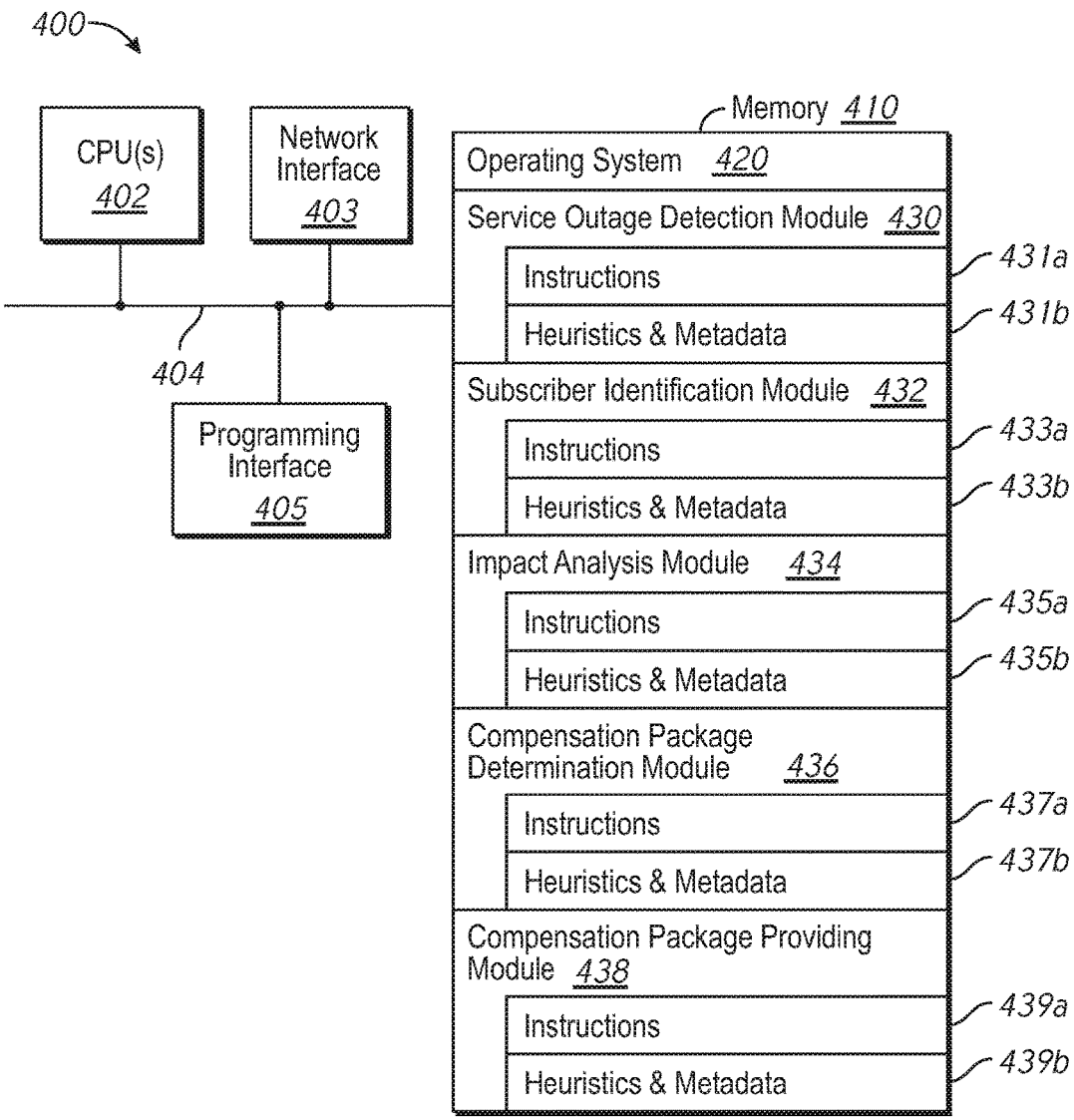
FIG. 4 is a block diagram of an example of a device in accordance with some implementations.

FIG. 4 is a block diagram of an example of a device 400 in accordance with some implementations. For example, in some implementations, the device 400 is similar to and adapted from the administration node 245 or the access node 250 in FIG. 2. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 402, one or more network interfaces 403, a memory 410, a programming (I/O) interface 408, and one or more communication buses 404 for interconnecting these and various other components.

In some implementations, the one or more communication buses 404 include circuitry that interconnects and controls communications between system components. The memory 410 includes high-speed random access memory, such as DRAM, SRAM, DDR RAM, or other random access solid state memory devices. In some implementations, the memory 410 includes non-volatile memory, such as one or more magnetic disk storage devices, optical disk storage devices, flash memory devices, or other non-volatile solid state storage devices. The memory 410 optionally includes one or more storage devices remotely located from the one or more CPUs 402. The memory 410 comprises a non-transitory computer readable storage medium. In some implementations, the memory 410 or the non-transitory computer readable storage medium of the memory 410 stores the following programs, modules and data structures, or a subset thereof including an optional operating system 420, a service outage detection module 430, a subscriber identification module 432, an impact analysis module 434, a redress measure determination module 436, and a redress measure providing module 438.

The operating system 420 includes procedures for handling various basic system services and for performing hardware dependent tasks.

In some implementations, the service outage detection module 430 is configured to detect a service outage. To that end, in various implementations, the service outage detection module 430 includes instructions and/or logic 431a, and heuristics and metadata 431b.

In some implementations, the subscriber identification module 432 is configured to identify a set of subscribers affected by the service outage. To that end, in various implementations, the subscriber identification module 432 includes instructions and/or logic 433a, and heuristics and metadata 433b.

In some implementations, the impact analysis module 434 is configured to determine an impact score for each of the affected subscribers. To that end, in various implementations, the impact analysis module 434 includes instructions and/or logic 435a, and heuristics and metadata 435b.

In some implementations, the redress measure determination module 436 is configured to determine a per-subscriber redress measure based on the impact score for the subscriber. To that end, in various implementations, the redress measure determination module 436 includes instructions and/or logic 437a, and heuristics and metadata 437b.

In some implementations, the redress measure providing module 438 is configured to provide redress measure to each of the affected subscribers as determined by the redress measure determination module 436. To that end, in various implementations, the redress measure providing module 438 includes instructions and/or logic 439*a*, and heuristics and metadata 439*b*.

Although the service outage detection module 430, the subscriber identification module 432, the impact analysis module 434, the redress measure determination module 436, and the redress measure providing module 438 are illustrated as residing on a single device (e.g., the device 400), it should be understood that in other implementations, any combination of the service outage detection module 430, the subscriber identification module 432, the impact analysis module 434, the redress measure determination module 436, and the redress measure providing module 438 may reside on separate devices.

Moreover, FIG. 4 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5:
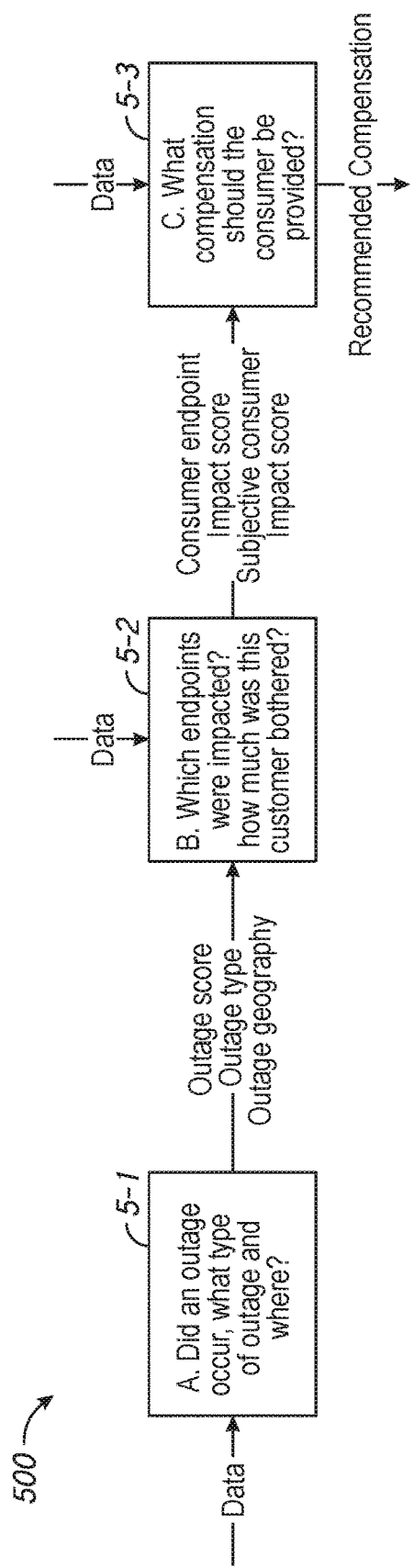
FIG. 5 is a diagram of a process for determining redress measures for a TV service outage based on subscriber impact analysis in accordance with some implementations.

FIG. 5 is a diagram of a process 500 for determining redress measures for a TV service outage based on subscriber impact analysis in accordance with some implementations. In various implementations, the process 500 is performed by a device with one or more processors and non-transitory memory such as the administration node 245 or the access node 250 in FIG. 2. In some implementations, the process 500 is performed by processing logic, including hardware, firmware, software, or a combination thereof. In some implementations, the process 500 is performed by a processor executing code stored in a non-transitory computer-readable medium (e.g., a memory).

According to some implementations, at each stage of the process 500, a machine learning approach may be applied. As one example, root cause analysis (RCA) may be used to determine the causes for the outage and identify the potential set of affected subscribers. As one example, the outage itself may be identified by watching the relevant key performance indicators (KPIs) of the system. Typical scenarios addressed by RCA include: (a) problems with the distribution network (e.g., rain fade for satellite distribution, severed cable for cable distribution, excess congestion for Internet subscribers, and/or the like); (b) problems in the data center/cloud hosting associated TV distribution (e.g., software or hardware problems such as a faulty server, faulty network equipment, and/or the like); and (c) problems with subscriber premises equipment (CPE) or other client devices (e.g., cable or DSL modem, STB, router, and/or the like). Data may be collected from websites, such as news websites including weather (e.g. weather.com) to assess weather patterns and/or other events, to assist in determining the cause of an outage.

As another example, user and entity behavior analysis (UEBA) may be used to identify subscribers affected by the outage and to infer the degree to which those subscribers were affected. As yet another example, an extension of sentiment analysis based on observed user behavior (e.g., rather than on text, as traditional sentiment analysis) may be used in order to quantify the extent to which a subscriber was impacted by the outage. In this way, it is possible to determine how much the user impact is worth in business terms. For example, the system suggests appropriate redress measures to the subscribers based on the likelihood the subscribers affected, based on the amount the subscribers were affected, and/or also based on the business importance of the subscribers.

To that end, as represented by block 5-1, the process 500 includes determining whether an outage has occurred, and, if an outage has occurred, determining the type of outage and the area affected by the outage. In some implementations, the device of a component thereof (e.g., the administration node 245 or the access node 250 in FIG. 2) detects the outage and classifies the outage, including the outage type, affected locations, affected device types, and/or the like, based on input data such as past history, data coming from various components of service provider network, feedback from the endpoints associated with the subscribers, feedback from the subscribers themselves, and/or the like. According to some implementations, the output from block 5-1 includes one or more of the outage scope, outage type, and outage geography.

In some implementations, the outage detection model uses RCA which takes into account at least some of the following data sources:
  Logs from the network and the system as to the state of the various software components in the system, the status of the various requests and the state of the network: throughput and latency of request/response pairs for each service, responses containing errors, end-to-end component failures and restarts, and resource exhaustion conditions;
  Details of the user behavior: the state of the RF (radio frequency) or QAM (quadrature amplitude modulation) tuner (e.g., locked, and to which frequency), VOD session state, ABR (adaptive bit-rate) download sessions with CDNs, event restarts, UI (user interface) interactions, and content consumption and purchase;
  External sources: utility company notifications of disruptions to infrastructure services, extreme weather notifications, sun-out dates, and reports of DoS (denial of service) attacks; and
  Geographical location of each user and other account information.

According to some implementations, the outage detection model includes the parameters/indicators described above and based on the RCA it is possible to determine if an outage occurred as well as classify the outage as to an outage type. For example, the outage types are classified according to:
  Internal cause of outage (e.g., outage in the SP network) is based on correlating operational and user behavior. In some implementations, the internal fault type is specified by the SP network.
  External cause of outage (e.g. distribution network or CPE) is based on correlating user behavior patterns with data accessed on the web such as weather or power outages.

Thus, according to some implementations, the output of block 5-1 includes an outage score, an outage type, and a scope of the outage including the time period and geographic boundaries. The outage score may define or characterize (e.g. objectively) whether an outage occurred and likely caused a lack of TV service to a particular geography or a particular subscriber.

As represented by block 5-2, the process 500 includes determining which endpoints were impacted by the outage and how much a corresponding customer/subscriber was bothered by the outage. In some implementations, the device of a component thereof (e.g., the administration node 245 or the access node 250 in FIG. 2) performs impact analysis on each affected subscriber based on the output data from block 5-1 and other input data such as past history, data coming from various components of service provider network, feedback from the endpoints associated with the subscribers, feedback from the subscribers themselves, and/or the like. According to some implementations, the output from block 5-2 includes one or more of a subscriber endpoint impact score, a subjective subscriber impact score, and/or the like. An impact score for a subscriber may define or characterize (e.g. subjectively) how much or to what extent the affected subscriber was impacted; for example, based on the subscriber's reaction or what content was missed due to the outage.

According to some implementations, the device or a component thereof (e.g., the administration node 245 or the access node 250 in FIG. 2) utilizes UEBA once subscribers are grouped/separated based on their geographical location and/or device type. In some implementations, the device or a component thereof (e.g., the administration node 245 or the access node 250 in FIG. 2) determines the likelihood they were really affected by the outage using various characterizations of user behavior across both time and devices.

According to some implementations, UEBA solutions look at patterns of human behavior, and then apply algorithms and statistical analysis to detect meaningful anomalies from those patterns. As one example, the device or a component thereof (e.g., the administration node 245 or the access node 250 in FIG. 2) inspects endpoint/consumption date to measure the difference in time between a tuner lock and a reboot to determine that this user was likely affected by the outage. According to some implementations, this algorithm further validates the likelihood that an endpoint was affected by the outage by comparing the geographic data of the outage with that of location of the user. In some implementations, in addition to determining whether the endpoint was affected by the outage, the device or a component thereof (e.g., the administration node 245 or the access node 250 in FIG. 2) also attempts to determine the subjective impact on a subscriber based on inspecting at least some of the following data sources:

Details of the user behavior from user consumption data including information focusing on key presses, and remote control or UI usage across time such as typical EPG usage.

Service calls made by a user.

Geographical location of a user.

As such, according to some implementations, the determination in block 5-2 is based on time series analysis of the user behavior data as described above in order to detect extra anomalous activity during the duration of the outage and to learn the outage impact per user during the specific time window. For example, during the outage period, a particular user is observed to have tried many UI actions in quick succession, which is uncharacteristic of this user. In this example, the impact score for the user may be weighted higher to indicate that the user was subjectively impacted by the outage.

As represented by block 5-3, the process 500 includes determining a redress measure to be provided to the subscriber for the outage. In some implementations, the device of a component thereof (e.g., the administration node 245 or the access node 250 in FIG. 2) determines the redress measure for each customer affected by the outage the based on per-customer impact analysis using the output data from block 5-2 and other input data such as past history, data coming from various components of service provider network, feedback from the endpoints associated with the subscribers, feedback from the subscribers themselves, and/or the like. According to some implementations, the output from block 5-3 includes a per-customer redress measure.

In some implementations, the device of a component thereof (e.g., the administration node 245 or the access node 250 in FIG. 2) determines per-subscriber redress measure based on at least some of the following data sources:

Outage type (e.g., external outages are worth less than internal outages).

Annual revenue from a subscriber.

Uptake of premium services.

The estimated impact on the specific subscriber.

The number of (e.g. close-in-time) outages experienced by the subscriber (e.g. the larger the number, the greater value of the redress measure).

According to some implementations, block 5-3 is an extension of sentiment analysis based on the observed user behavior (e.g., rather than on text, as traditional sentiment analysis) that quantifies the extent the user was frustrated by his or her inability to obtain services.

In some implementations, the device of a component thereof (e.g., the administration node 245 or the access node 250 in FIG. 2) collects consumption data, service calls, and locations of all subscribers affected by the outage and ranks the subscribers based on negative impact using an ongoing collected domain knowledge. Based on this information, the SP is able to make an informed decision as to the appropriate value of the redress measure for the outage on a per-subscriber basis. Alternatively, in some implementations, the device of a component thereof (e.g., the administration node 245 or the access node 250 in FIG. 2) automates the redress measure determination process by setting fixed policies associated with the value of the redress measure by impact score. According to some implementations, the redress measure is proactively offered to subscribers to pre-empt potential telephone calls from subscribers or negative reviews from subscribers due to the outage.

FIGS. 6 through 23 are further provided to illustrate additional examples and implementations of the techniques described above in relation to FIGS. 1 through 5, especially user and entity behavior analysis (UEBA) type examples and implementations.

Figure 6:
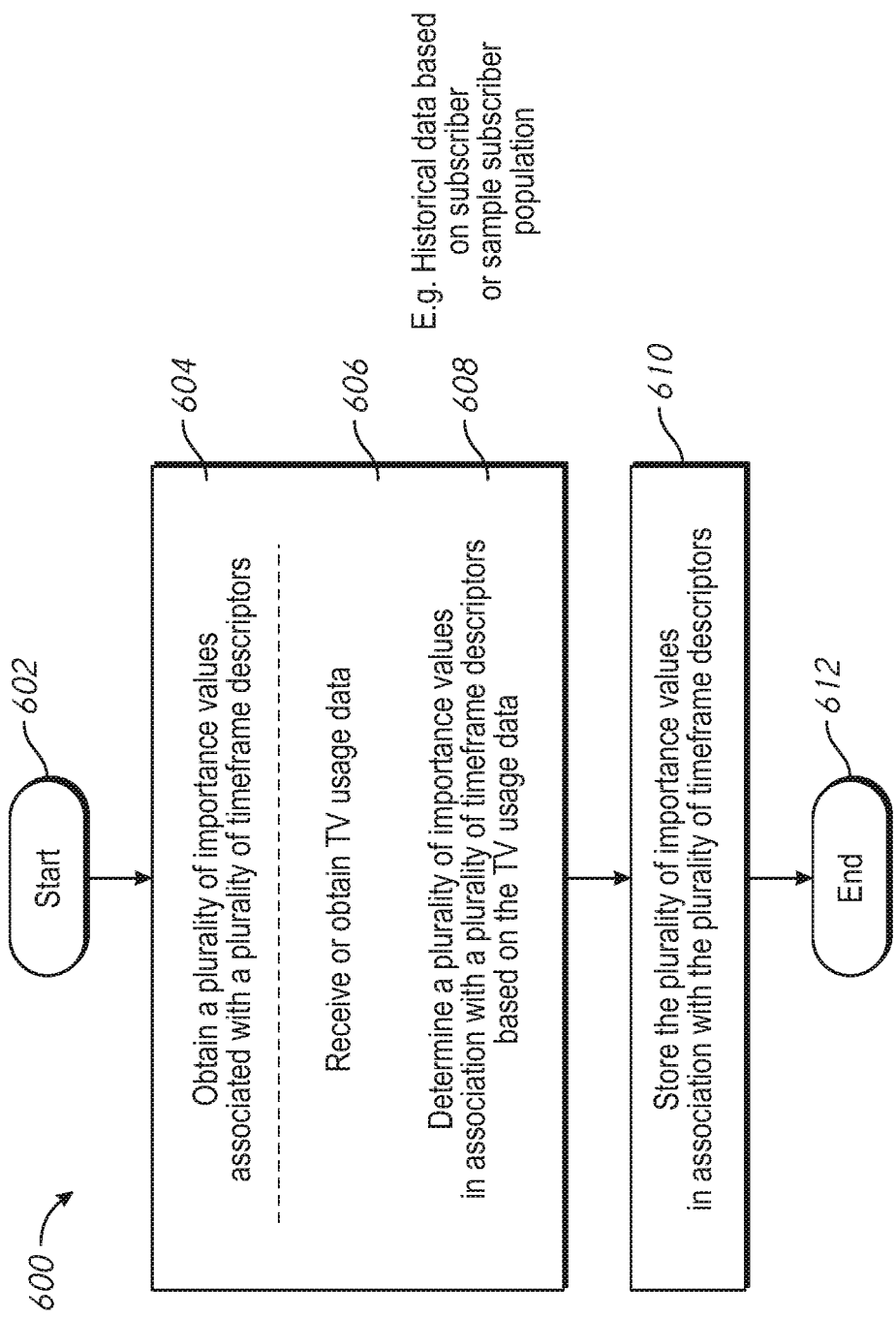
FIG. 6 is a flowchart for describing a method for converting TV usage data into an appropriate form for determining an impacted subscriber or an impact score in accordance with the method of FIG. 7.
Figure 7:
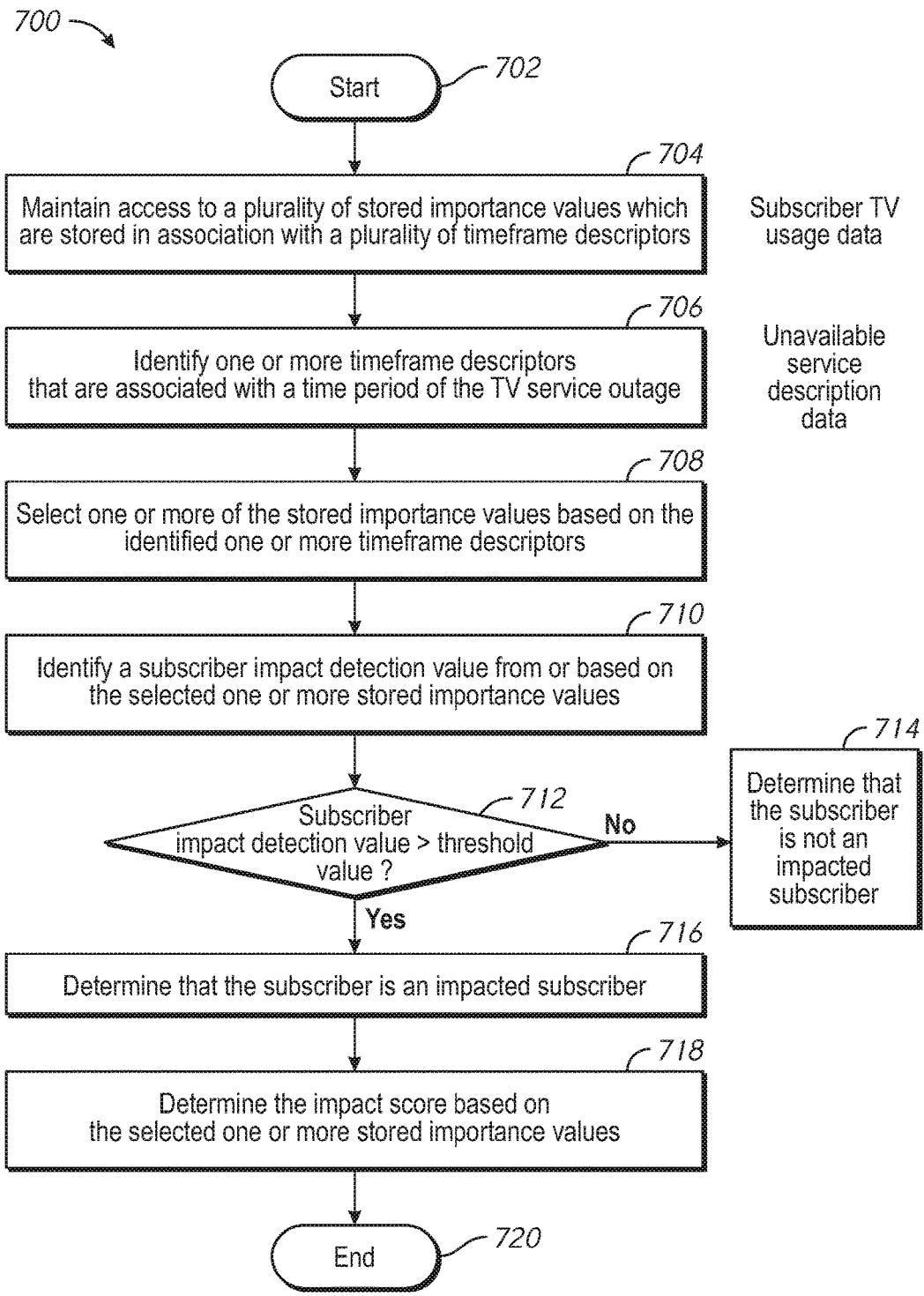
FIG. 7 is a flowchart for describing a method for use in determining that a subscriber is an impacted subscriber and/or determining an impact score for the impacted subscriber.

FIG. 6 is a flowchart 600 for describing a method for converting TV usage data into an appropriate form for analysis, which may be for determining an impacted subscriber or an impact score in accordance with the method of FIG. 7.

Beginning at a start block 602 of FIG. 6, a plurality of importance values associated with a plurality of timeframe descriptors are obtained (step 604 of FIG. 6). The one or more timeframe descriptors may be indicative of a timeframe of TV usage. An importance value may indicate the importance of the timeframe indicated by the associated timeframe descriptor. For example, a high importance value indicates that the timeframe indicated by the timeframe descriptor is likely, predicted, and/or expected to be a timeframe of TV usage for the subscriber. An importance value associated with a corresponding timeframe descriptor may be determined, calculated or set in accordance with an expected or predicted TV usage of the subscriber at the described timeframe.

In some implementations, step 604 of FIG. 6 may be achieved by executing steps 606 and 608. More particularly, TV usage data are received or obtained (step 606 of FIG. 6). A plurality of importance values are determined in association with a plurality of timeframe descriptors based on the received or obtained TV usage data (step 608 of FIG. 6).

Figure 12:
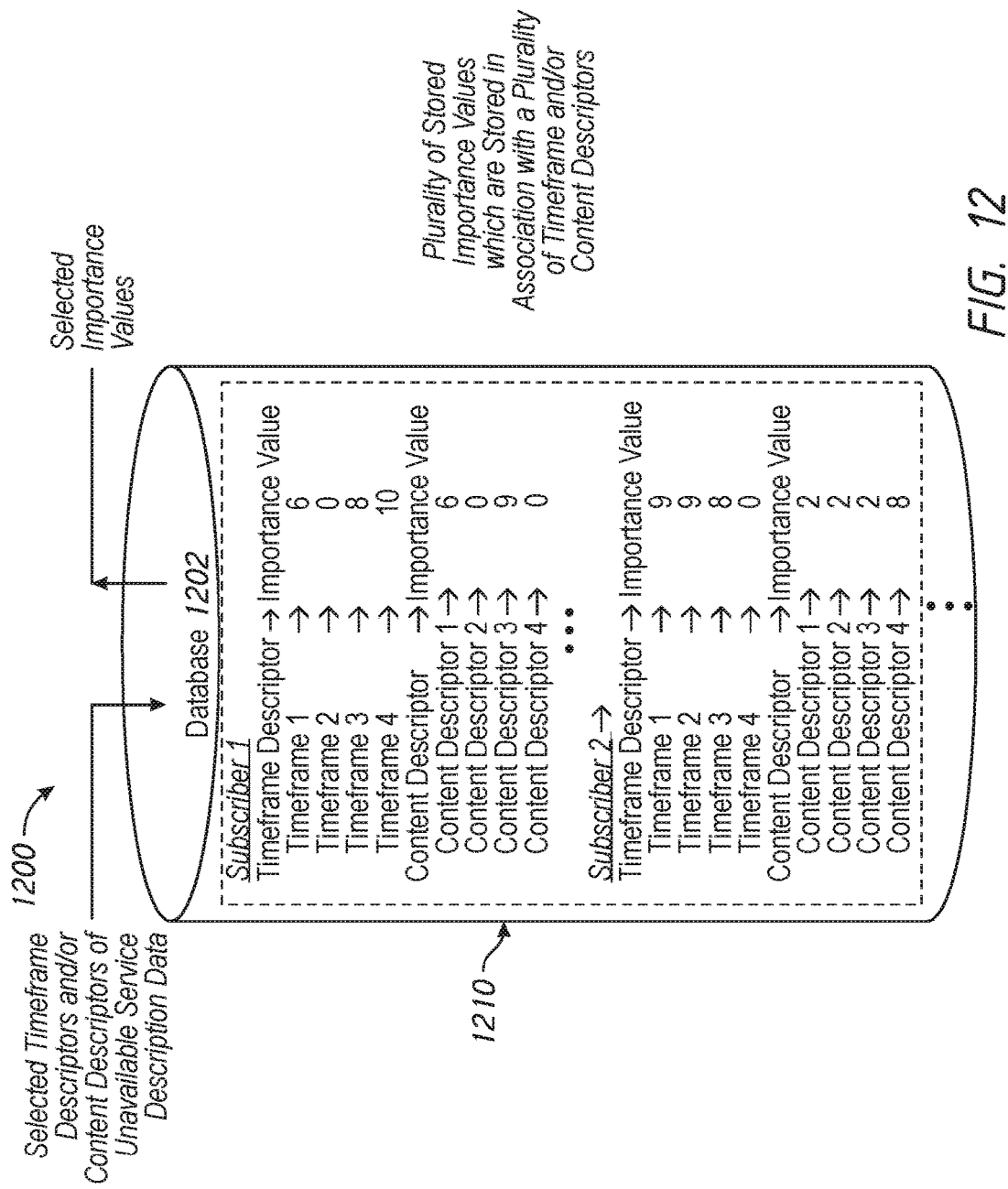
FIG. 12 is an illustration of a database which maintains a stored association between a plurality of importance values and a plurality of timeframe and content descriptors.

The plurality of importance values are stored in association with the plurality of timeframe descriptors in a database (step 610 of FIG. 6) (see e.g. FIG. 12 which shows a diagram 1200 of a database 1202 having such stored data 1210). The flowchart ends at and end block 612 of FIG. 6.

Figure 10:
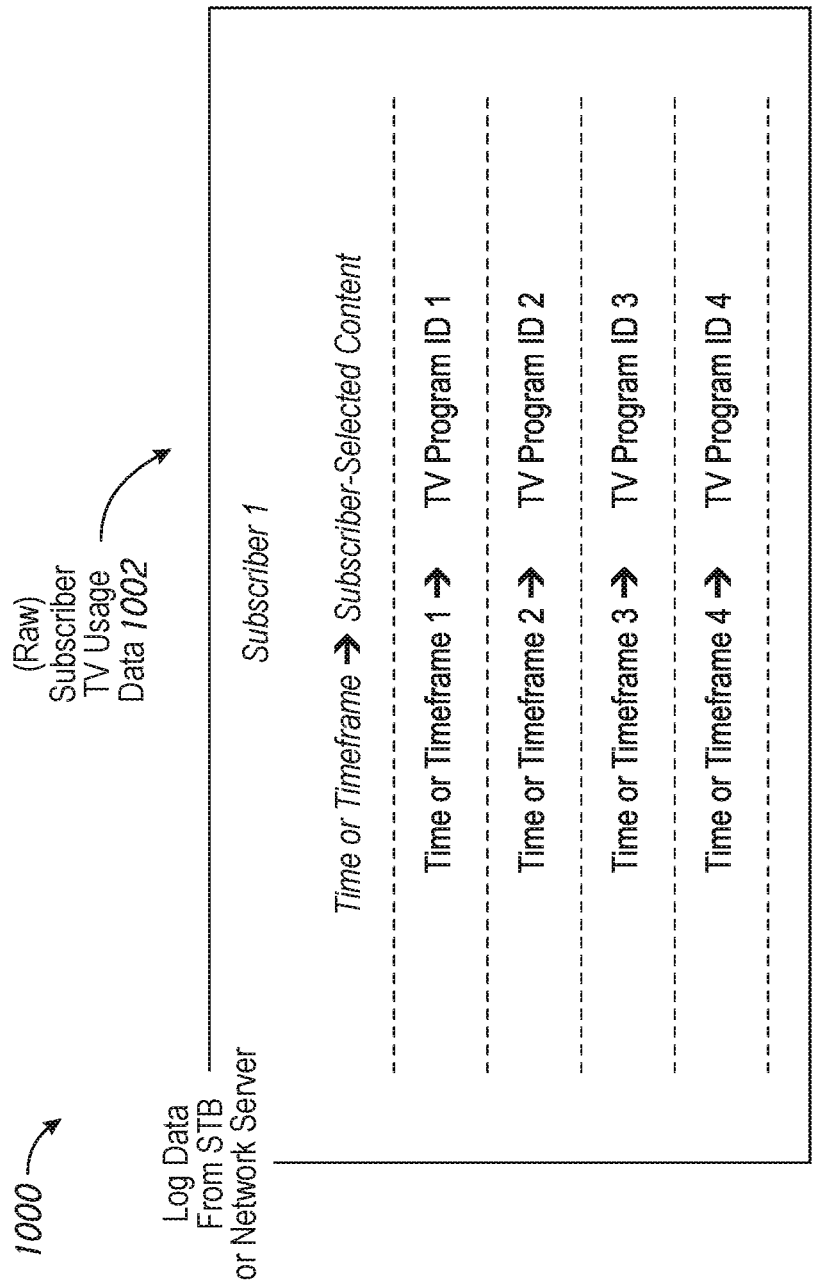
FIG. 10 is a diagram showing raw subscriber TV usage data obtained (e.g. via regular uploads) from the set-top box (STB) of the subscriber (or alternatively, a network server)

In some implementations, the TV usage data may be derived from raw TV usage data of the subscriber or subscribers of a sample population. Referring ahead to FIG. 10, an illustrative diagram 1000 shows (raw) subscriber TV usage data 1002 obtained (e.g. via regular uploads) from the set-top box (STB) of the subscriber (or alternatively, a network server). The raw subscriber TV usage data 1002 may be or be referred to as log data from the STB or network server. The raw subscriber TV usage data 1002 indicates a plurality of TV program IDs corresponding to watched TV programs, each of which stored in association with a time or timeframe.

In some implementations, the TV usage data may be historical TV usage data of the subscriber. In other implementations, the subscriber TV usage data may be historical TV usage data of a sample subscriber population. In other implementations, the TV usage data may be based on or more one or more subscriber preferences or likes; one or more ratings or rankings; one or more popularity indicators; a predetermined TV usage pattern; a TV usage pattern of a sample subscriber population; and a TV usage pattern of the subscriber.

FIG. 7 is a flowchart 700 for describing a method for use in determining that a subscriber is an impacted subscriber and/or determining an impact score for the impacted subscriber. The method of FIG. 7 may make use of subscriber TV usage data including one or more timeframe descriptors or indicators. The one or more timeframe descriptors may be indicative of a timeframe of TV usage.

Beginning at a start block 702 of FIG. 7, access is maintained to a plurality of stored importance values which are stored in association with a plurality of timeframe descriptors (step 704 of FIG. 7). For example, the method described in relation to FIG. 6 may be performed prior to execution of the method of FIG. 7. Note that an importance value may indicate the importance of the timeframe indicated by the associated timeframe descriptor.

One or more timeframe descriptors that are associated with a time period of the TV service outage are identified (step 706 of FIG. 7). One or more of the stored importance values are then selected based on the identified one or more timeframe descriptors (step 708 of FIG. 7). A subscriber impact detection value is identified from or based on the selected one or more stored importance values (step 710 of FIG. 7).

If the subscriber impact detection value is greater than a threshold value (step 712 of FIG. 7), then it is determined that the subscriber is an impacted subscriber (step 716 of FIG. 7). If the subscriber impact detection value is not greater than a threshold value at step 712, then it is determined that the subscriber is not an impacted subscriber.

An impact score for the impacted subscriber is determined based on the selected one or more of the stored importance values (step 718 of FIG. 7). The impact score may be determined as a function of the stored importance values. The impact score may also be determined as a function of other variables and techniques described herein or otherwise. The flowchart ends at an end block 720 of FIG. 7.

In some implementations, a redress measure for the impacted subscriber may be determined based on the impact score. A message (e.g. e-mail, text message, or voicemail) with an offer to provide the redress measure may be (automatically) generated and sent to the impacted subscriber, with the service provider as the initiator. The message may include an offer for an additional service or product of the provider. Indications of one or more (e.g. close-in-time) resulting actions of the subscriber (e.g. cancellation or non-cancellation of TV service, purchase or non-purchase of additional service or product offered, etc.) may be used as feedback to direct or tailor the redress measure offered.

Figure 8:
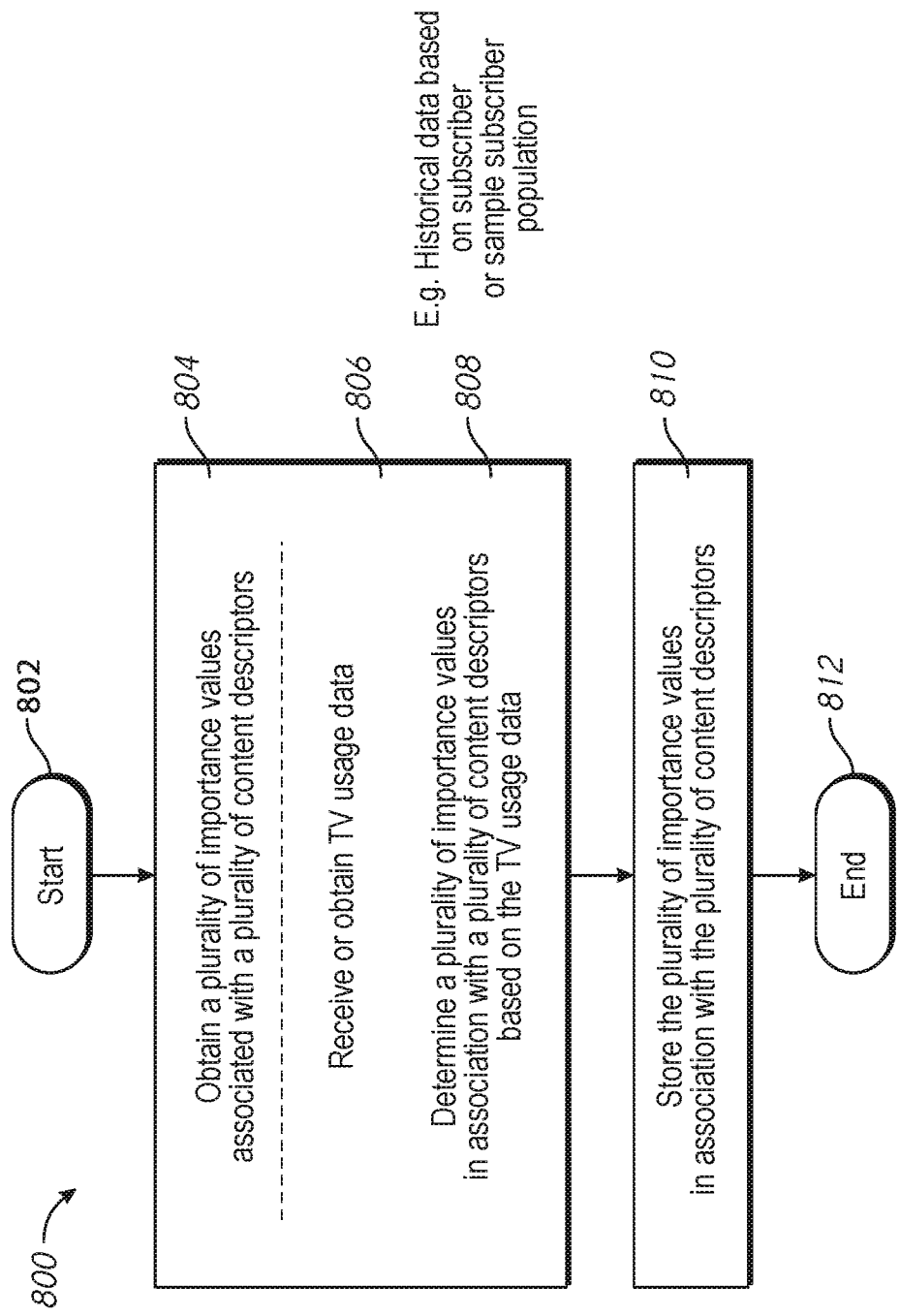
FIG. 8 is a flowchart for describing a method for converting TV usage data into an appropriate form for determining an impacted subscriber or an impact score in accordance with the method of FIG. 9.
Figure 9:
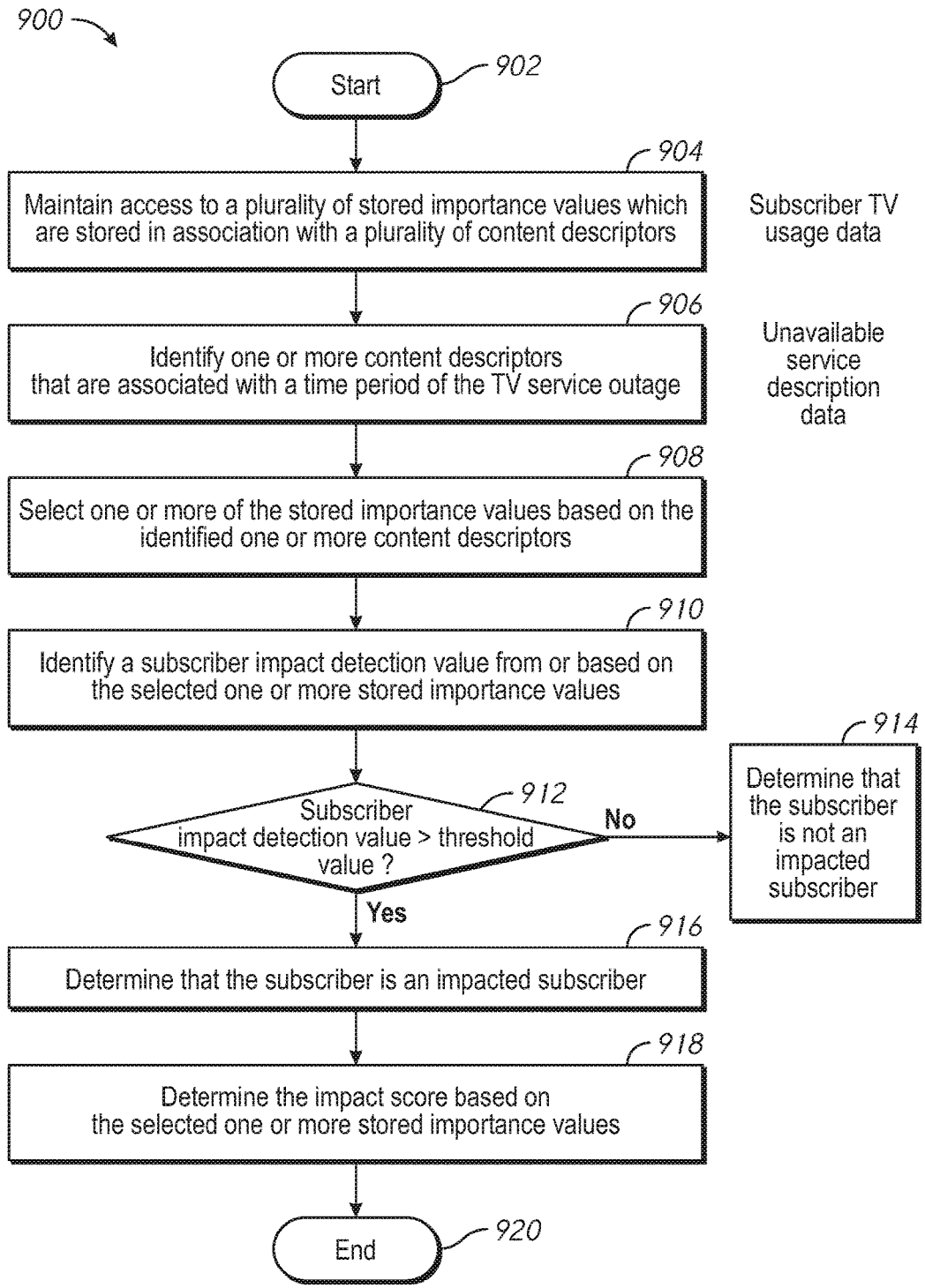
FIG. 9 is a flowchart for describing a method for use in determining that a subscriber is an impacted subscriber and/or determining an impact score for the impacted subscriber.

FIG. 8 is a flowchart 800 for describing a method for converting TV usage data into an appropriate form for analysis, which may be used for determining an impacted subscriber or an impact score in accordance with the method of FIG. 9.

Figure 11:
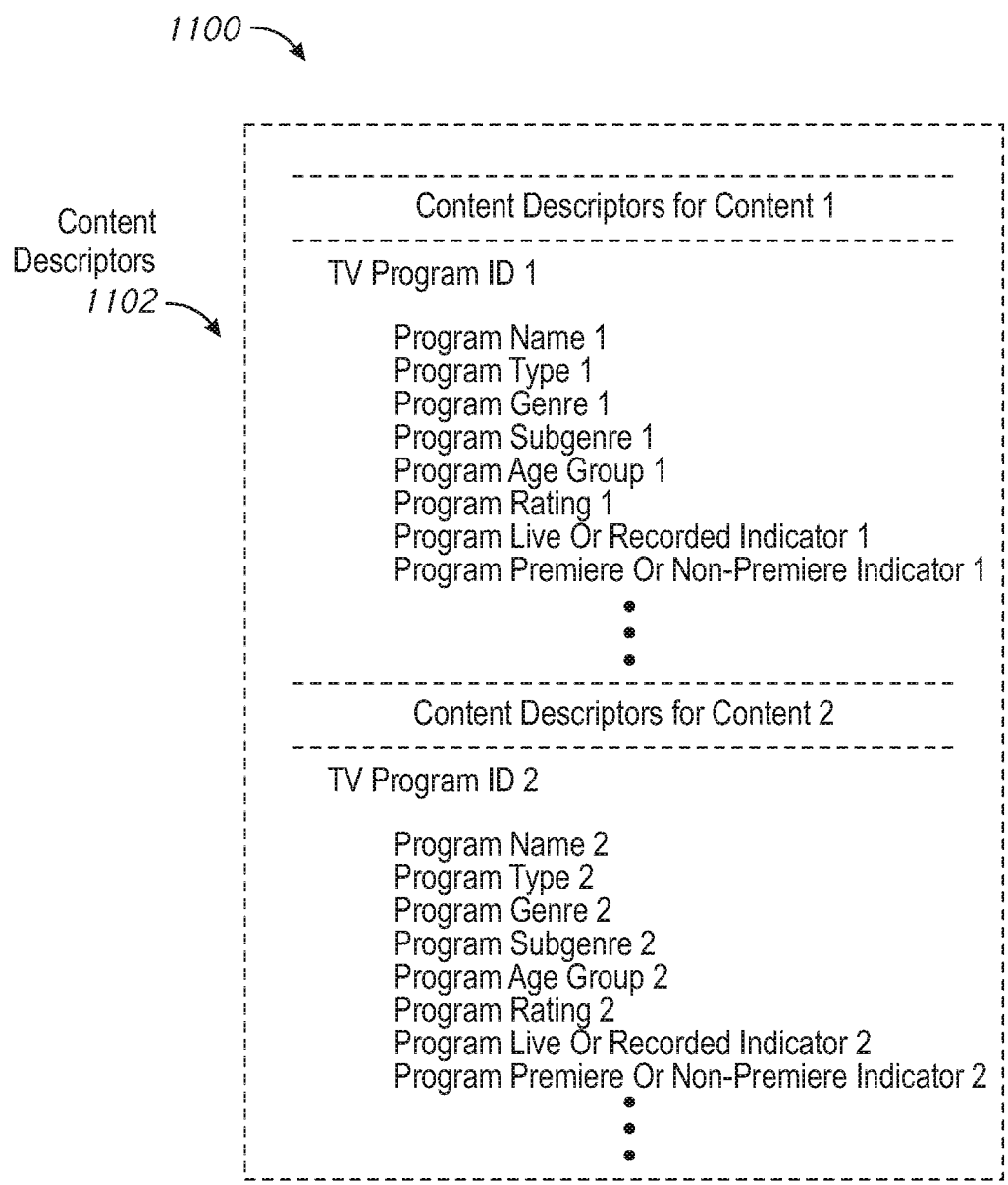
FIG. 11 is a diagram showing a plurality of content descriptors associated with each program ID of a plurality of program IDs.

Beginning at a start block 802 of FIG. 8, a plurality of importance values associated with a plurality of content descriptors are obtained (step 804 of FIG. 8). The one or more content descriptors may be descriptive of the content of TV usage (e.g. Genre such as sports, news, drama; "Live" or Recorded, etc.) or descriptive of a TV channel. See e.g. FIG. 11 illustrating a diagram 1100 of a plurality of content descriptors 1102 which are descriptive of TV program content identified by TV program ID. An importance value may indicate an importance of the content described by the associated content descriptor. For example, a high importance value indicates that the content described by the content descriptor is likely, predicted, and/or expected to be watched by the subscriber. An importance value associated with a corresponding content descriptor may be determined, calculated or set in accordance with an expected or predicted TV usage of the subscriber at the described timeframe.

In some implementations, step 804 may be achieved by executing steps 806 and 808 of FIG. 8. More particularly, TV usage data are received or obtained (step 806 of FIG. 8). A plurality of importance values are determined in association with a plurality of content descriptors based on the received or obtained TV usage data (step 808 of FIG. 8).

The plurality of importance values are stored in association with the plurality of timeframe descriptors in a database (step 810 of FIG. 8). See e.g. FIG. 12 which shows a diagram 1200 of a database 1202 having such stored data 1210. The flowchart ends at and end block 612 of FIG. 6.

In some implementations, the TV usage data in the method of FIG. 8 may be derived from raw TV usage data of the subscriber or subscribers of a sample population. Again, referring ahead to FIG. 10, the illustrative diagram 1000 shows (raw) subscriber TV usage data 1002 obtained (e.g. via regular uploads) from the set-top box (STB) of the subscriber (or alternatively, a network server). The raw subscriber TV usage data 1002 may be or be referred to as log data from the STB or network server. The raw subscriber TV usage data 1002 indicates a plurality of times or timeframes associated with a plurality of TV program IDs corresponding to watched TV programs (and/or TV channels). Content descriptors may be identified in association with the TV program ID, for example; any or any significant or statistically significant usage behaviors associated with a content descriptor may be utilized.

In some implementations, the TV usage data may be historical TV usage data of the subscriber. In other implementations, the subscriber TV usage data may be historical TV usage data of a sample subscriber population. In other implementations, the TV usage data may be based on or more one or more subscriber preferences or likes; one or more ratings or rankings; one or more popularity indicators; a predetermined TV usage pattern; a TV usage pattern of a sample subscriber population; and a TV usage pattern of the subscriber.

FIG. 9 is a flowchart 900 for describing a method for use in determining that a subscriber is an impacted subscriber and/or determining an impact score for the impacted subscriber. The method of FIG. 9 may make use of subscriber TV usage data including one or more content descriptors or indicators. The one or more content descriptors may be descriptive of a content or TV channel associated with TV usage.

Beginning at a start block 902 of FIG. 9, access is maintained to a plurality of stored importance values which are stored in association with a plurality of content descriptors (step 904 of FIG. 9). For example, the method described in relation to FIG. 9 may be performed prior to execution of the method of FIG. 9. Note that an importance value may indicate the importance of the content described by the associated content descriptor.

One or more content descriptors that are associated with content affected during a time period of the TV service outage are identified (step 906 of FIG. 9). One or more of the stored importance values are then selected based on the identified one or more content descriptors (step 908 of FIG. 9). A subscriber impact detection value is identified from or based on the selected one or more stored importance values (step 910 of FIG. 9).

If the subscriber impact detection value is greater than a threshold value (step 912 of FIG. 9), then it is determined that the subscriber is an impacted subscriber (step 916 of FIG. 9). If the subscriber impact detection value is not greater than a threshold value at step 912, then it is determined that the subscriber is not an impacted subscriber (step 914 of FIG. 9).

An impact score for the impacted subscriber is determined based on the selected one or more of the stored importance values (step 918 of FIG. 9). The impact score may be determined as a function of the stored importance values. The impact score may also be determined as a function of other variables and techniques described herein or otherwise. The flowchart ends at an end block 920 of FIG. 9.

In some implementations, a redress measure for the impacted subscriber may be determined based on the impact score. A message (e.g. e-mail, text message, or voicemail) with an offer to provide redress measure may be (automatically) generated and sent to the impacted subscriber, with the service provider as the initiator. The message may include an offer for an additional service or product of the provider. Indications of one or more (e.g. close-in-time) resulting actions of the subscriber (e.g. cancellation or non-cancellation of TV service, purchase or non-purchase of additional service or product offered, etc.) may be used as feedback to direct or tailor the redress measure offered.

Figure 13:
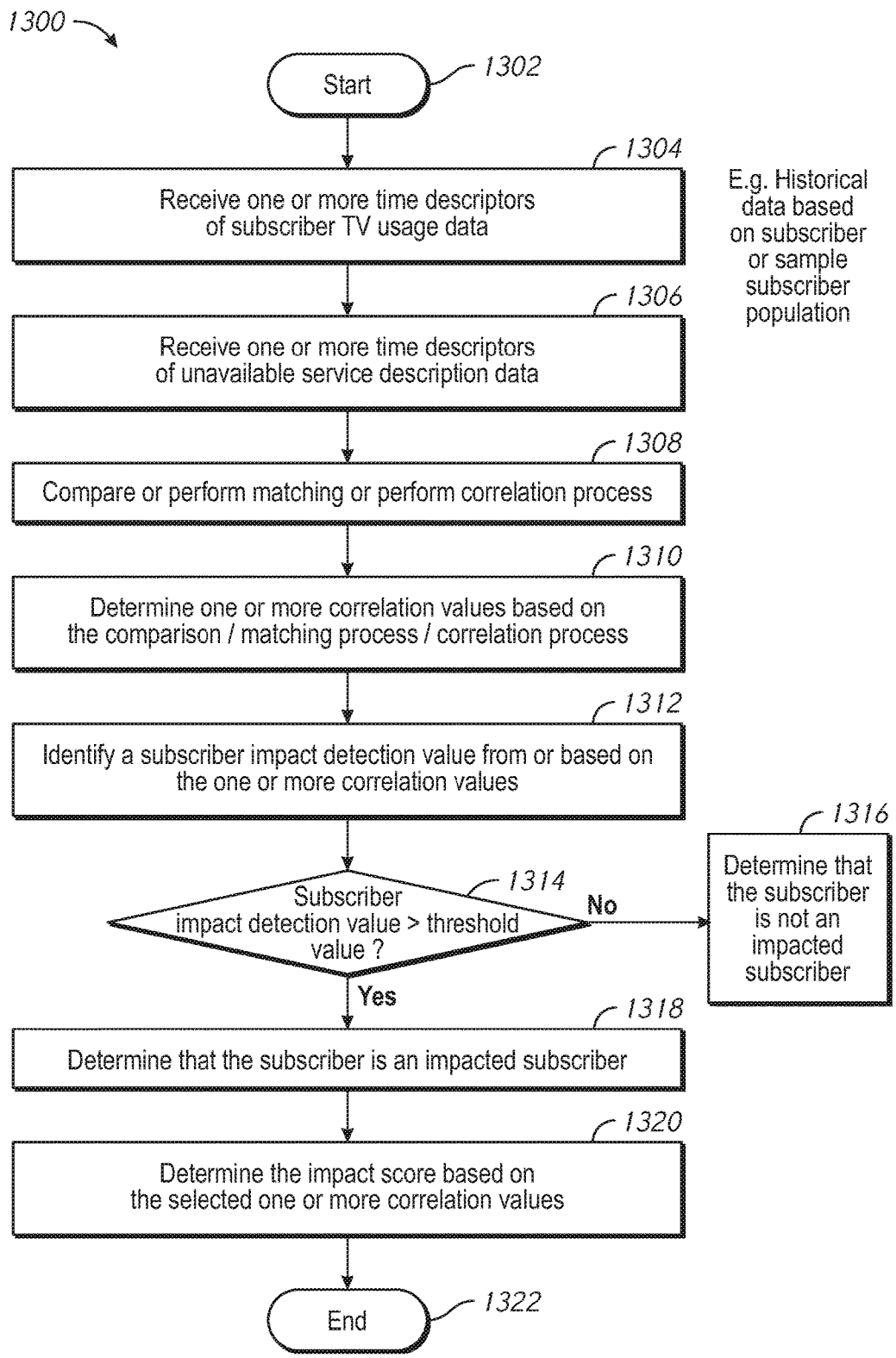
FIG. 13 is a flowchart for describing a method for use in determining that a subscriber is an impacted subscriber and/or determining an impact score for the impacted subscriber.
Figure 14:
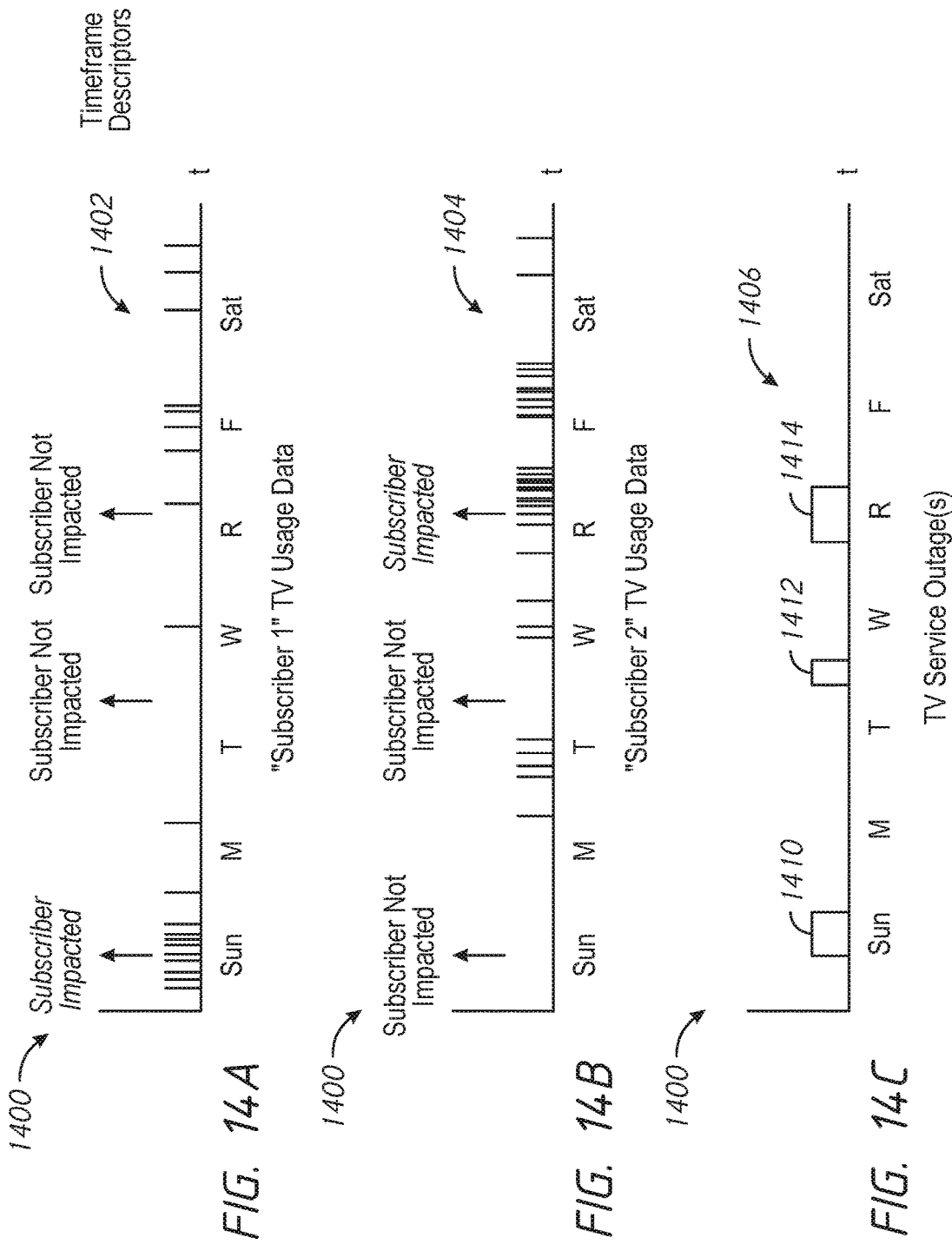
FIGS. 14A-14C are illustrative graphs showing subscriber TV service usages indicated by a plurality of timeframe descriptors for two different subscribers.

FIG. 13 is a flowchart 1300 for describing a method for use in determining that a subscriber is an impacted subscriber and/or determining an impact score for the impacted subscriber. The method of FIG. 13 may make use of subscriber TV usage data including one or more timeframe descriptors or indicators. The one or more timeframe descriptors may be indicative of a timeframe of TV usage.

Beginning at a start block 1302 of FIG. 13, one or more timeframe descriptors of subscriber TV usage data are received (step 1304 of FIG. 13). See example data 1402 in diagram 1400 of FIG. 14(*a*) for "Subscriber 1" and example data 1404 in FIG. 14(*b*) for "Subscriber 2."

In some implementations, the subscriber TV usage data in step 1304 may be known or historical subscriber TV usage data of the subscriber being assessed. In other implementations, the subscriber TV usage data may be known or historical subscriber TV usage data of a sample subscriber population.

In yet other implementations, the subscriber TV usage data in step 1304 may be based on or derived from at least one of program ratings data, program popularity data, subscriber preference data, subscriber type data, or subscriber profile data.

One or more timeframe descriptors associated with unavailable service description data of an TV service outage are also received (step 1306 of FIG. 13). The one or more timeframe descriptors may correspond to one or more time periods of the TV service outage. See example data 1406 in FIG. 14(*c*) for a plurality of time periods 1410, 1412, and 1414 of one or more TV service outages.

A process to compare, match, or correlate the timeframe descriptors of the subscriber TV usage data and the timeframe descriptors of the unavailable service description data is performed (step 1308 of FIG. 13). One or more correlation values are determined based on the comparison, matching, or correlation process (step 1310 of FIG. 13).

A subscriber impact detection value is then identified from or determined based on the one or more correlation values (step 1312 of FIG. 13). If the subscriber impact detection value is greater than a threshold value (step 1314 of FIG. 13), then the subscriber is determined to be an impacted subscriber (step 1318 of FIG. 13). See the example data 1402 in FIG. 14(*a*) which shows a correlation and therefore a subscriber impact indication for "Subscriber 1" (e.g. Sunday football game programming); for comparison, view the example data of FIG. 14(*b*) which also shows a correlation and therefore a subscriber impact indication for "Subscriber 2" (e.g. Thursday night sitcoms). If the subscriber TV outage detection value is not greater than the threshold value at step 1314, however, then it is determined that the subscriber is not an impacted subscriber (step 1316 of FIG. 13).

An impact score for the impacted subscriber is determined based on the one or more correlation values (step 1320 of FIG. 13). In some implementations, the impact score in step 1320 is calculated as a function of the one or more correlation values. The impact score may also be determined as a function of other variables and techniques described herein or otherwise. Note that the determinations/identifications in steps 1312 and 1320 may in fact be the same determinations/identifications (e.g. the same calculation process) if desired. The flowchart ends at an end block 1322 of FIG. 13).

In some implementations, a redress measure for the impacted subscriber may be determined based on the impact score. A message (e.g. e-mail, text message, or voicemail) with an offer to provide the redress measure may be (automatically) generated and sent to the impacted subscriber, with the service provider as the initiator. The message may include an offer for an additional service or product of the provider. Indications of one or more (e.g. close-in-time) resulting actions of the subscriber (e.g. cancellation or non-cancellation of TV service, purchase or non-purchase of additional service or product offered, etc.) may be used as feedback to direct or tailor the redress measure offered.

Figure 15:
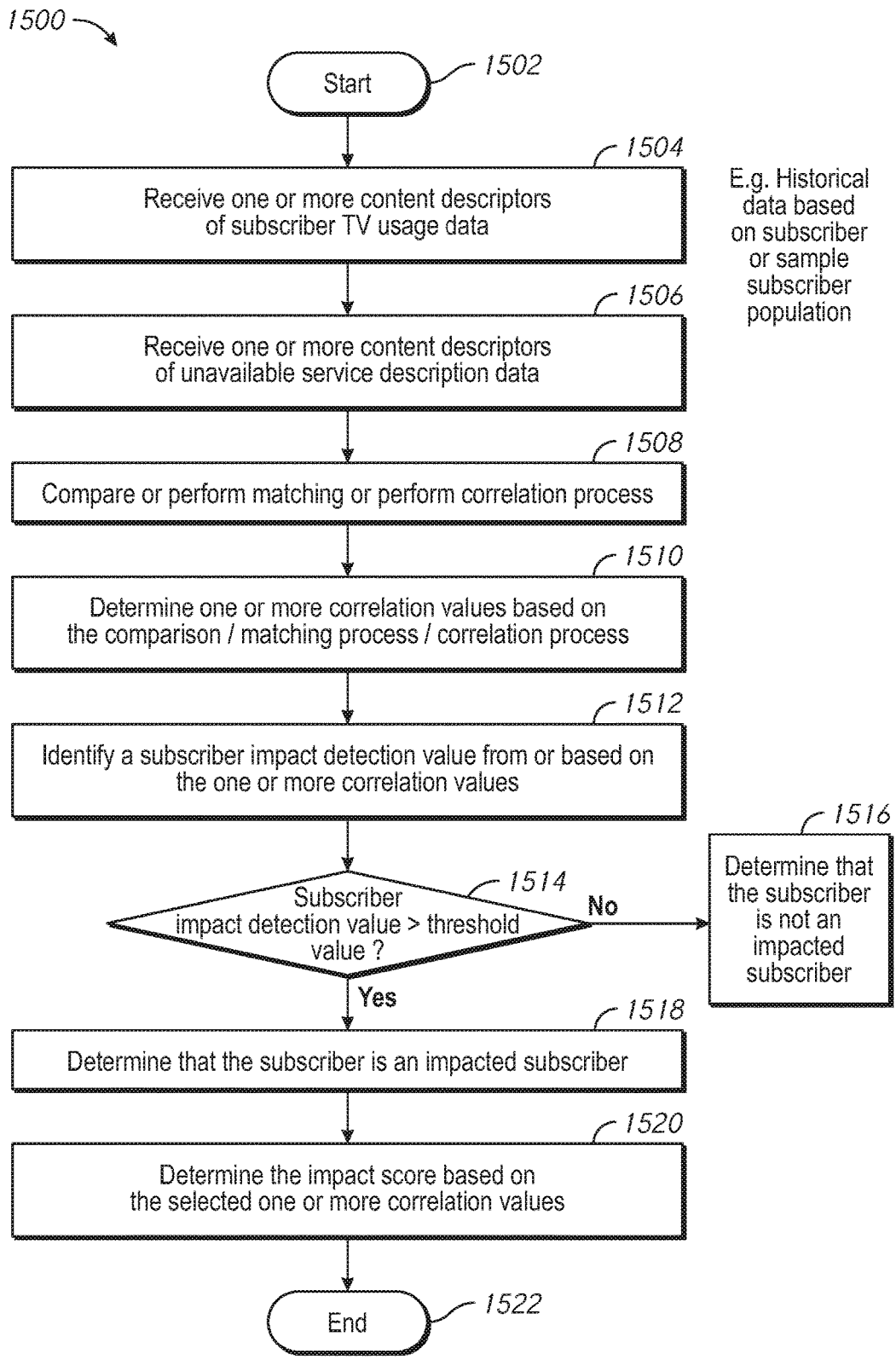
FIG. 15 is a flowchart for describing a method for use in determining that a subscriber is an impacted subscriber and/or determining an impact score for the impacted subscriber.
Figure 16A:
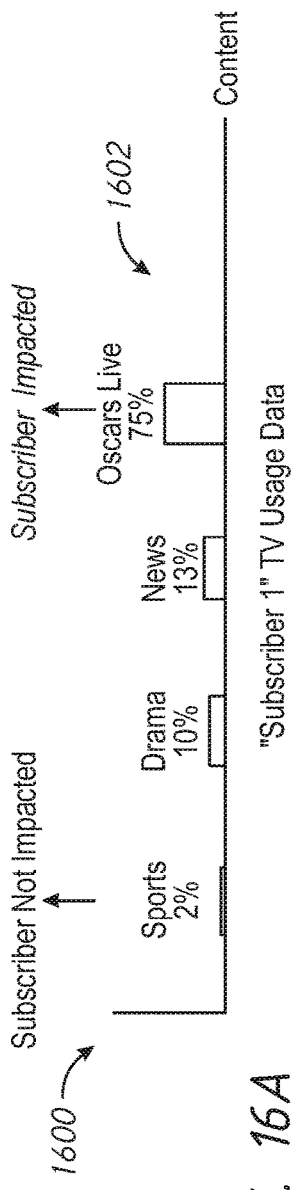
FIGS. 16A-16C are illustrative graphs showing subscriber TV service usages indicated by a plurality of content descriptors for two different subscribers.
Figure 16B:
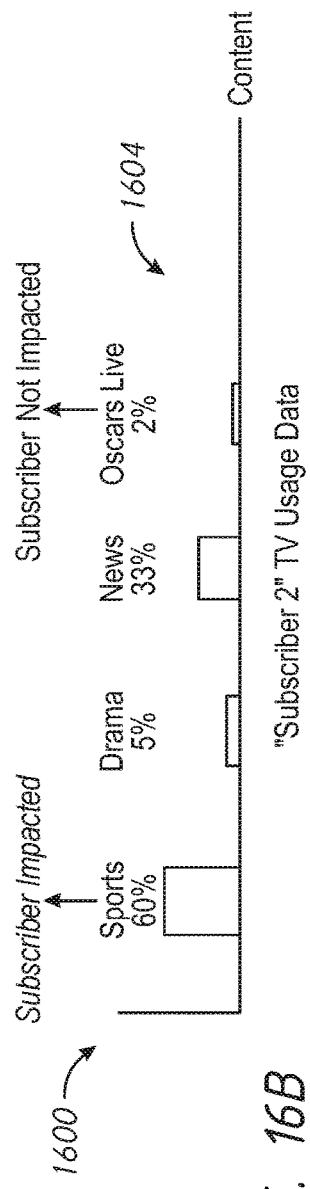
Figure 16C:
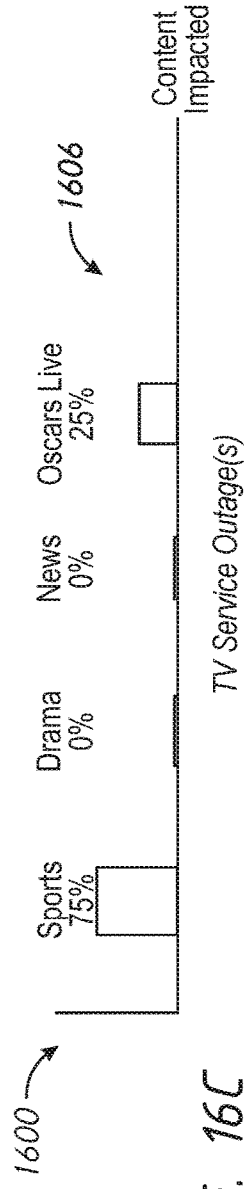

FIG. 15 is a flowchart 1500 for describing a method for use in determining that a subscriber is an impacted subscriber and/or determining an impact score for the impacted subscriber. The method of FIG. 15 may make use of subscriber TV usage data including one or more content descriptors or indicators. The one or more content descriptors may be descriptive of the content or TV channel(s) of the subscriber TV usage (e.g. descriptive of the "watched" content of the subscriber or subscribers) (e.g. see FIG. 11).

Beginning at a start block 1502 of FIG. 15, one or more content descriptors of subscriber TV usage data are received (step 1504 of FIG. 15). See example data 1602 in diagram 1600 of FIG. 16(*a*) for "Subscriber 1" and example data 1604 in FIG. 16(*b*) for "Subscriber 2."

In some implementations, the subscriber TV usage data in step 1504 may be known or historical subscriber TV usage data of the subscriber being assessed. In other implementations, the subscriber TV usage data may be known or historical subscriber TV usage data of a sample subscriber population.

In yet other implementations, the subscriber TV usage data in step 1504 may be based on or derived from at least one of program ratings data, program popularity data, subscriber preference data, subscriber type data, or subscriber profile data.

One or more content descriptors associated with unavailable service description data of a TV service outage are also received (step 1506 of FIG. 15). The one or more content descriptors may correspond to the (possible) content affected or impacted by the TV service outage. See example data 1606 in FIG. 16(*c*) for the extent to which a plurality of TV genres (i.e. Sports, Drama, News, and "Oscars" Live) may have been affected due to the one or more TV service outages.

A process to compare, match, or correlate the content descriptors of the subscriber TV usage data and the content descriptors of the unavailable service description data is performed (step 1508 of FIG. 15). One or more correlation values are determined based on the comparison, matching, or correlation process (step 1510 of FIG. 15).

A subscriber impact detection value is then identified from or determined based on the one or more correlation values (step 1512 of FIG. 15). If the subscriber impact detection value is greater than a threshold value (step 1514 of FIG. 15), then the subscriber is determined to be an impacted subscriber (step 1518 of FIG. 15). See the example data 1602 in FIG. 16(*a*) which shows a correlation and therefore a subscriber impact indication for "Subscriber 1" (e.g. "Oscars" Live program); for comparison, view the example data of FIG. 16(*b*) which also shows a correlation and therefore a subscriber impact indication for "Subscriber 2" (e.g. Sports). If the subscriber TV outage detection value is not greater than the threshold value at step 1514, however, then it is determined that the subscriber is not an impacted subscriber (step 1516 of FIG. 15).

An impact score for the impacted subscriber is determined based on the one or more correlation values (step 1518 of FIG. 15). In some implementations, the impact score in step 1520 is calculated as a function of the one or more correlation values. The impact score may also be determined as a function of other variables and techniques described herein or otherwise. Note that the determinations/identifications in steps 1512 and 1518 may in fact be the same determinations/ identifications (e.g. the same calculation process) if desired. The flowchart ends at an end block 1522 of FIG. 15.

In some implementations, a redress measure for the impacted subscriber may be determined based on the impact score. A message (e.g. e-mail, text message, or voicemail) with an offer to provide the redress measure may be (automatically) generated and sent to the impacted subscriber, with the service provider as the initiator. The message may include an offer for an additional service or product of the provider. Indications of one or more (e.g. close-in-time) resulting actions of the subscriber (e.g. cancellation or non-cancellation of TV service, purchase or non-purchase of additional service or product offered, etc.) may be used as feedback to direct or tailor the redress measure offered.

FIG. 17 through 23 are provided to illustrate further examples and implementations of techniques which may be based on use of subscriber TV service user interface (UI) usage data. These techniques may make use of a TV UI (see FIGS. 17 and 18), which may be a remote control 1702 (FIG. 17) of a set-top box (STB) or a remote control presentation 1804 (FIG. 18) in a visual touch screen display 1802 of a smart phone, a computer tablet, or the like. In FIG. 17, remote control 1702 is illustrated to have a plurality of keys 1702 associated with various input signals or commands communicated to the STB. Note that the techniques of FIGS. 19-23 which follow may utilize user and entity behavior analysis (UEBA)-type or -like processing with use of such TV UI.

Figure 19:
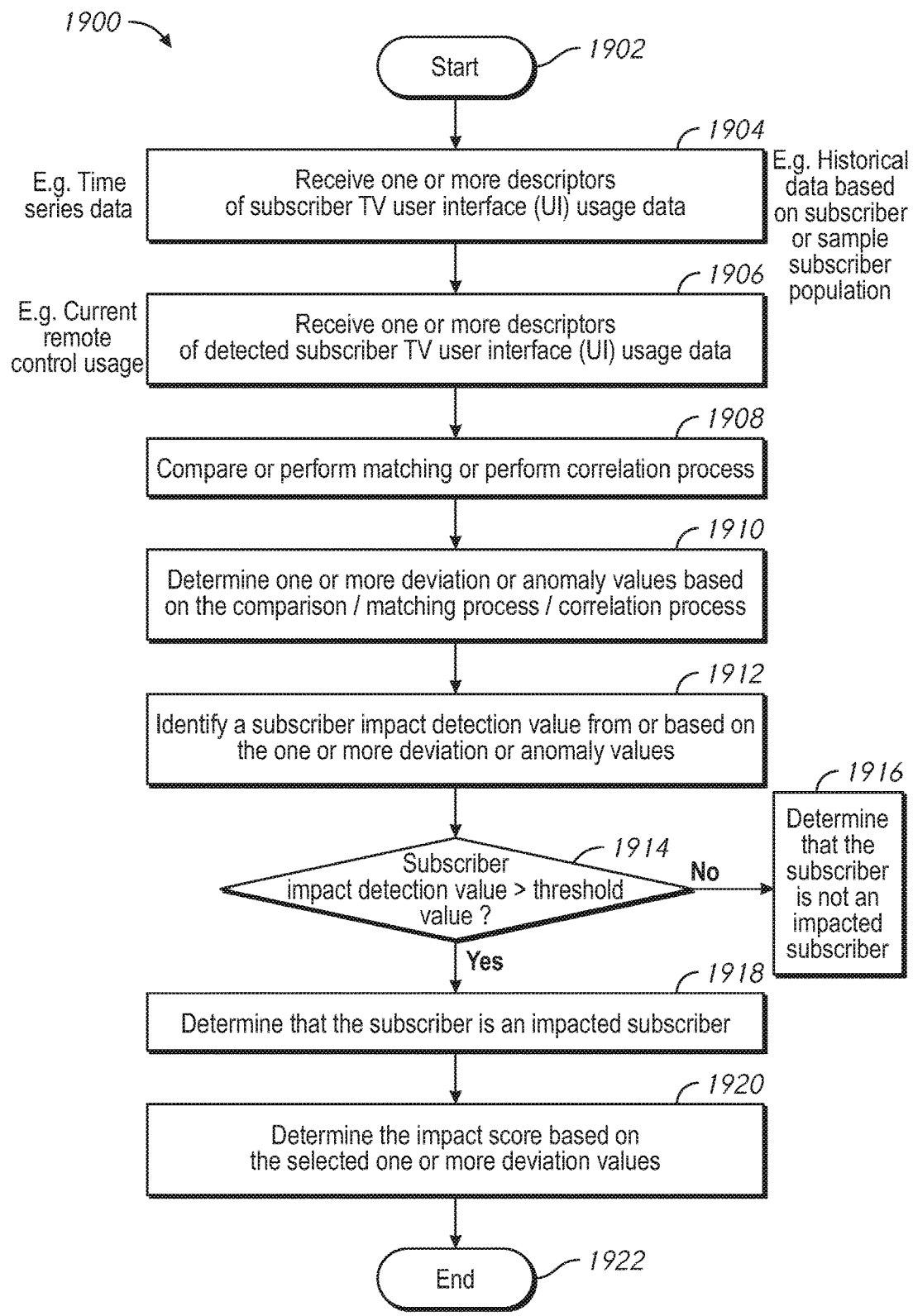
FIG. 19 is a flowchart for describing a method for use in determining that a subscriber is an impacted subscriber and/or determining an impact score for the impacted subscriber.

FIG. 19 is a flowchart 1900 for describing a method for use in determining that a subscriber is an impacted subscriber and/or determining an impact score for the impacted subscriber. The method of FIG. 19 is based on the use of subscriber TV user interface (UI) usage data (e.g. usage of the remote control of the set-top box).

Beginning at a start block 1902 of FIG. 19, a plurality of descriptors of subscriber TV UI usage data are received (step 1904 of FIG. 19). The subscriber TV UI usage data may be indicative or representative of "normal" subscriber TV UI usage. The one or more descriptors of the subscriber TV UI usage data may be or include, for example, one or more timeframe descriptors. In some implementations, the one or more descriptors are indicative or representative of a time series of TV UI commands or signals. See example data in FIG. 20(*a*) in diagram 2000.

In some implementations, the subscriber TV UI usage data in step 1904 may be historical subscriber TV UI usage data of the subscriber being assessed. In other implementations, the subscriber TV UI usage data may be historical subscriber TV UI usage data of a sample subscriber population.

A plurality of descriptors of actual detected subscriber TV UI usage data of a subscriber are also received (step 1906 of FIG. 19). See example data in FIG. 20(*b*) for a "Subscriber 1," as well as example data in FIG. 20(*c*) for a Subscriber 2" for comparison purposes.

Then, a process to compare, match, or correlate the descriptors of the subscriber TV UI usage data and the descriptors of the actual detected subscriber TV UI usage data is performed (step 1908 of FIG. 19). One or more deviation or anomaly values are determined based on the comparison, matching, or correlation process (step 1910 of FIG. 19).

A subscriber impact detection value is then identified from or determined based on the one or more deviation or anomaly values (step 1912 of FIG. 19). If the subscriber impact detection value is greater than a threshold value (step 1914 of FIG. 19), then the subscriber is determined to be an impacted subscriber (step 1916 of FIG. 19). Here, an UI anomaly has been detected to exist (e.g. multiple successive TV channel changes, excessive use of remote control, etc.). See the example data in FIG. 20(*b*), showing anomalies detected for "Subscriber 1"; for comparison, view the example data of FIG. 20(*c*) where no anomalies are detected. If the subscriber TV outage detection value is not greater than the threshold value at step 1914, however, then it is determined that the subscriber is not an impacted subscriber (step 1916 of FIG. 19). The flowchart ends at an end block 1922 of FIG. 19).

Figure 21:
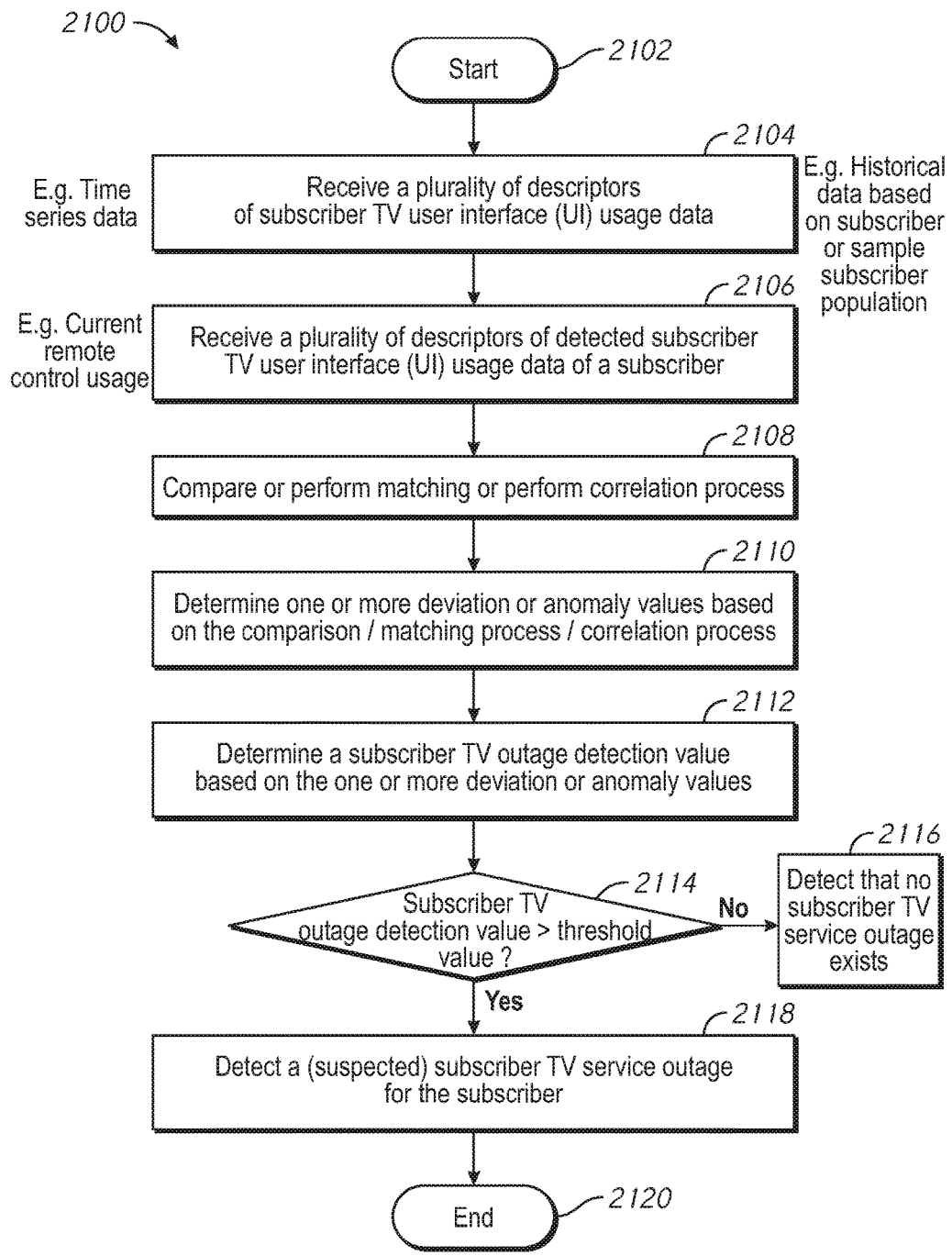
FIG. 21 is a flowchart for describing a method for use in detecting a (e.g. suspected) TV service outage for a subscriber.

FIG. 21 is a flowchart 2100 for describing a method for use in detecting a (e.g. suspected) TV service outage for a subscriber. The method of FIG. 21 is based on the use of subscriber TV user interface (UI) usage data (e.g. usage of the remote control of the set-top box).

Beginning at a start block 2102 of FIG. 21, a plurality of descriptors of subscriber TV UI usage data are received (step 2104 of FIG. 21). The subscriber TV UI usage data may be indicative or representative of "normal" subscriber TV UI usage. The one or more descriptors of the subscriber TV UI usage data may be or include, for example, one or more timeframe descriptors. In some implementations, the one or more descriptors are indicative or representative of a time series of TV UI commands or signals.

In some implementations, the subscriber TV UI usage data may be historical subscriber TV UI usage data of the subscriber. In other implementations, the subscriber TV UI usage data may be historical subscriber TV UI usage data of a sample subscriber population.

A plurality of descriptors of actual detected subscriber TV UI usage data of the subscriber are received (step 2104 of FIG. 21). Then, a process to compare, match, or correlate the descriptors of the subscriber TV UI usage data and the descriptors of the actual detected subscriber TV UI usage data is performed (step 2106 of FIG. 21). One or more deviation or anomaly values are determined based on the comparison, matching, or correlation process (step 2108 of FIG. 21).

A subscriber TV outage detection value is determined based on the one or more deviation or anomaly values (step 2110 of FIG. 21). For example, the subscriber TV outage detection value may be determined based on an aggregate or sum of the one or more deviation values.

If the subscriber TV outage detection value is greater than a threshold value (step 2112 of FIG. 21), then a suspected subscriber TV service outage for the subscriber is detected (step 2116 of FIG. 21). Here, an UI anomaly has been detected to exist (e.g. multiple successive TV channel changes, excessive use of remote control, etc.). If the subscriber TV outage detection value is not greater than the threshold value at step 2112, however, then no subscriber TV service outage exists (step 2114 of FIG. 21). The flowchart ends at an end block 2118 of FIG. 21.

Figure 22:
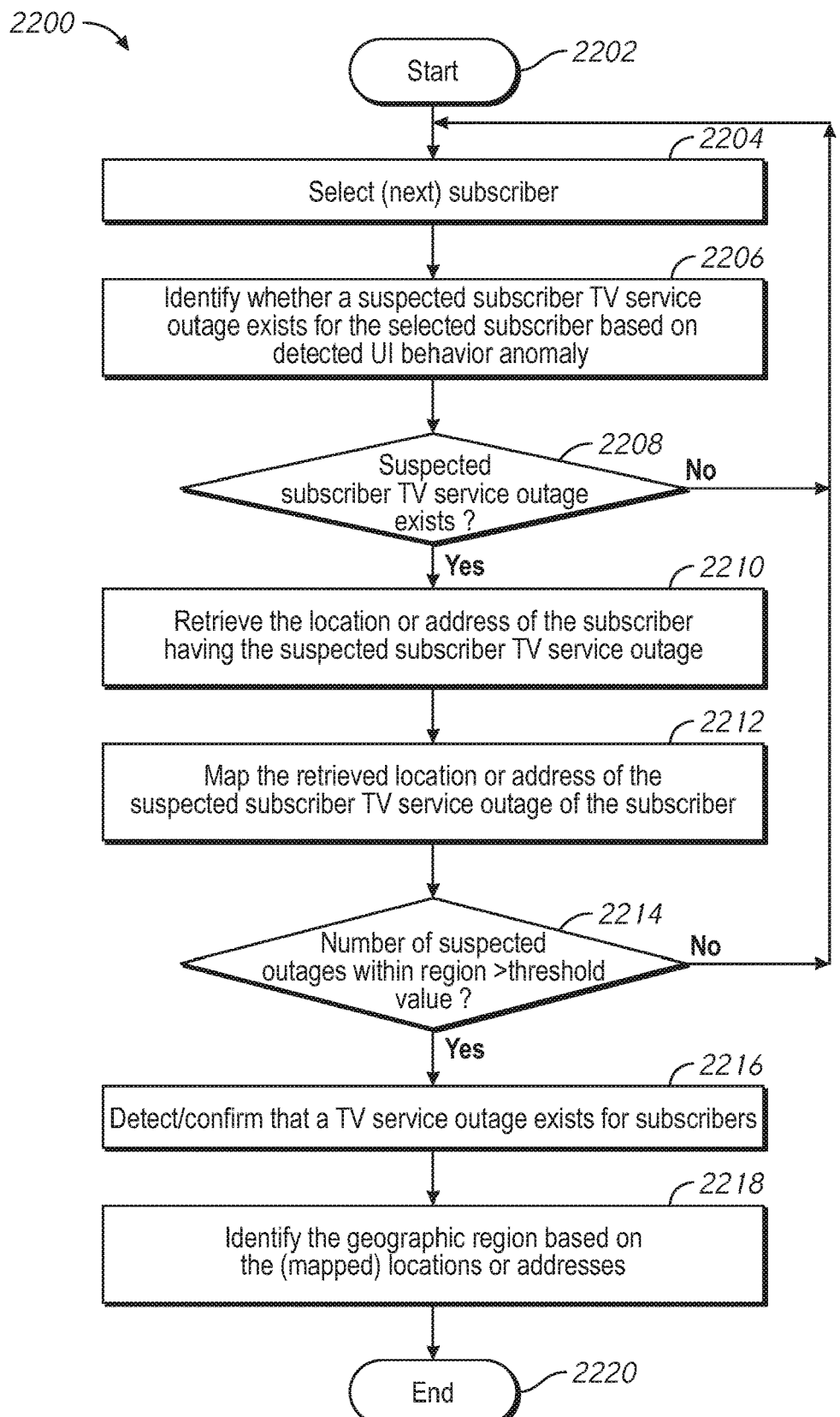
FIG. 22 is a flowchart for describing a method for use in detecting a TV service outage for a plurality of subscribers, as well as identifying a geographic region of the detected TV service outage.

FIG. 22 is a flowchart 2200 for describing a method for use in detecting a TV service outage for a plurality of subscribers, as well as identifying a geographic region of the detected TV service outage. The method of FIG. 22 is based on the use of subscriber TV user interface (UI) usage data (e.g. usage of the remote control of the set-top box). The method of FIG. 22 may be especially useful where it is otherwise difficult to detect a TV service outage and/or a scope of the geographic region affected. Thus, the method of FIG. 22 may be especially useful in confirming that a TV service outage exists and confirming the scope of the geographic region of the TV service outage.

Beginning at a start block 2202 of FIG. 22, a subscriber is selected for consideration (step 2204 of FIG. 22). It is identified whether a suspected subscriber TV service outage exists for the selected subscriber based on a detected TV UI behavior anomaly for the subscriber (step 2206 of FIG. 22). For example, step 2206 may be performed using the method of the flowchart 2100 of FIG. 21, previously described.

If the suspected subscriber TV service outage exists (step 2208 of FIG. 2208), the location or address of the subscriber associated with the suspected TV service outage is retrieved (step 2210 of FIG. 22). The retrieved location or address of the suspected TV service outage of the subscriber is mapped, marked on a map, or just generally marked or indicated (step 2212 of FIG. 22).

The number of suspected TV service outages (e.g. identified within a predetermined distance from each other) are counted. If the number of these suspected TV service outages is greater than a threshold value (step 2214 of FIG. 22), it is detected or configured that a TV service outage exists for the subscribers (step 2216 of FIG. 22). If the number of these suspected TV service outages is not greater than the threshold value (step 2214 of FIG. 22), the process is directed back to step 2204, where the next subscriber is selected for consideration.

A geographic region of the TV service outage may be determined or identified based on the mapped or indicated locations or addresses of the subscribers (step 2218 of FIG. 22). The flowchart ends at an end block 2210.

Figure 23:
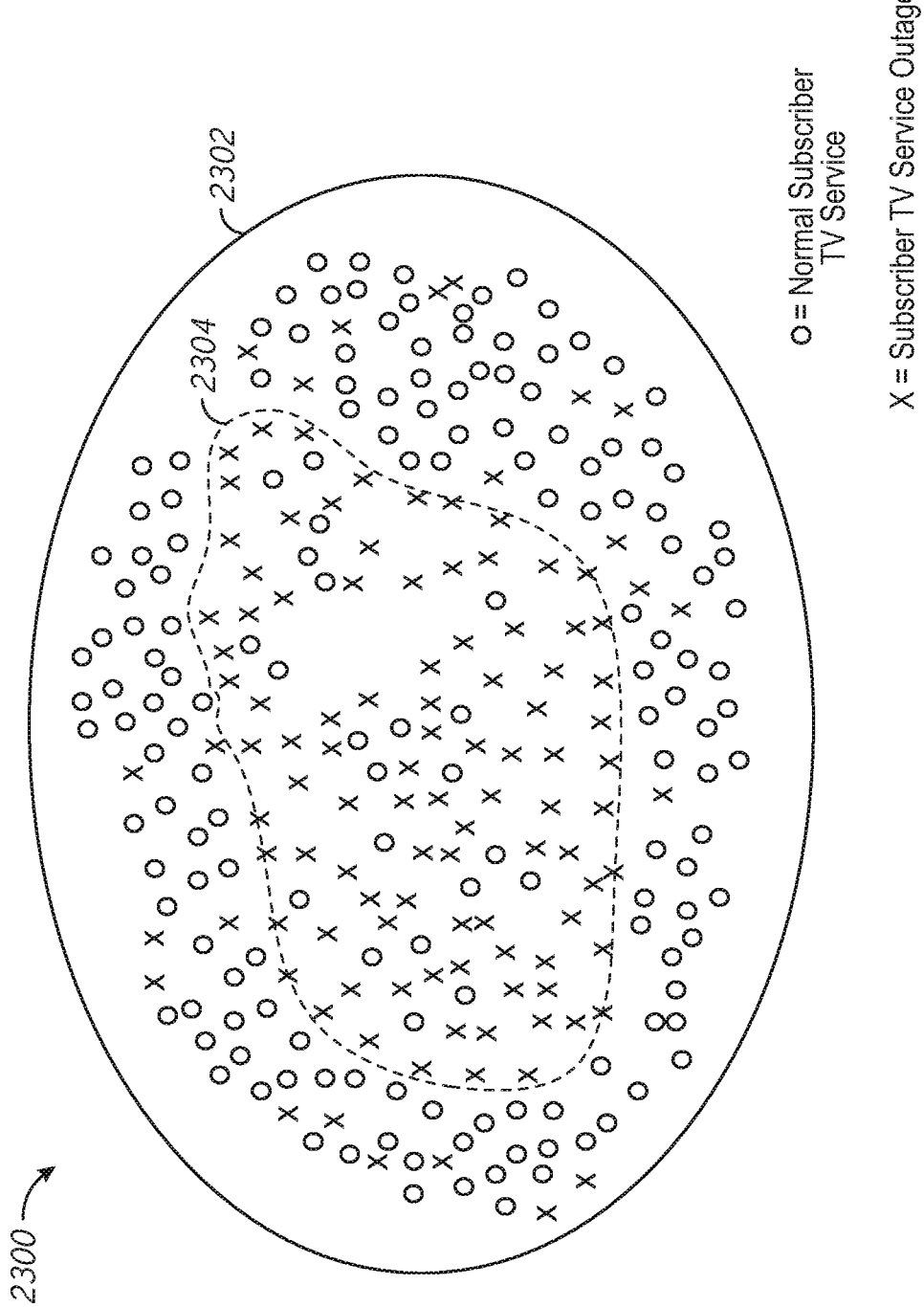
FIG. 23 is an illustrative diagram showing a map presentation indicting a geographic region of a detected TV service outage.

Relatedly in FIG. 23, a map presentation 2300 is shown. Map presentation 2300 illustrates a first geographic region 2302 indicating a plurality of subscriber locations "O" having normal subscriber TV service a plurality of subscriber locations "X" having detected TV service outages detected in accordance with the method of FIG. 21. A second geographic region 2304 indicates the scope of TV service outage detected in accordance with step 2218 of the method of FIG. 22.

Thus, techniques for use in determining redress measures for a television (TV) service outage based on impact analysis have been described. A TV service outage may be associated with a TV system apparatus including a TV user interface (UI). In one illustrative example, one or more subscribers impacted by the TV service outage are determined. An impact score is determined for each one of the subscribers. A redress measure for each one of the subscribers is then determined based on their corresponding impact scores. An impacted subscriber and/or an impact score may be determined based at least in part on subscriber TV or TV UI usage data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a node in a service provider network,
   identifying a subscriber to the service provider network affected by a television (TV) service outage, wherein the TV service outage is identified based at least in part on anomaly exists for at least a threshold number of subscribers in a subscriber network that is communicatively coupled to the service provider network;
   identifying one or more timeframe descriptors or one or more content descriptors associated with a time period of or content offered during the TV service outage, wherein the one or more timeframe descriptors are indicative of one or more timeframes within the time period, and the one or more content descriptors are descriptive of the content offered during the TV service outage;
   selecting one or more of a plurality of stored importance values that are associated with the identified one or more timeframe or content descriptors, wherein the one or more of the plurality of stored importance values associated with the one or more timeframe descriptors are calculated based on a predicted TV usage of the subscriber at the time period, and the one or more of the plurality of stored importance values associated with the one or more content descriptors indicate the content is predicted to be watched by the subscriber; and
   calculating an impact score for the subscriber as a function of the one or more of the plurality of stored importance values; and
   initiating a redress measure for the subscriber based on the impact score exceeding a threshold value, including:
   generating a message including the redress measure determined based on the image score;
   obtaining one or more close-in-time resulting actions of the subscriber as a feedback to the redress measure; and
   sending the message incorporating the feedback to the subscriber via a network.

2. The method of claim 1, wherein the impact score is determined based at least in part on subscriber TV or TV UI usage data, and the subscriber TV or TV UI usage data are indicative of an expected or detected subscriber TV or TV UI usage over a time period of the TV service outage.

3. The method of claim 1, wherein the impact score is determined based at least in part on subscriber TV or TV UI usage data, and the subscriber TV or TV UI usage data comprises one or more content descriptors derived from at least one of program ratings data, program popularity data, subscriber preference data, subscriber type data, subscriber profile data, or historical subscriber TV or TV UI usage data.

4. The method of claim 1, wherein the impact score is determined based at least in part on subscriber TV or TV UI usage data, and the subscriber TV usage data comprises one or more timeframe or content descriptors derived from historical subscriber TV or TV UI usage data.

5. The method of claim 1, wherein:
   the impact score is determined based at least in part on subscriber TV or TV UI usage data and unavailable service description data;
   the subscriber TV or TV UI usage data are indicative of a subscriber TV or TV UI usage over a time period of the TV service outage; and
   the unavailable service description data are descriptive of unavailable services the TV service outage.

6. The method of claim 5, further comprising:
   comparing one or more timeframe descriptors of the subscriber TV or TV UI usage data with one or more timeframe descriptors of the unavailable service description data; and
   calculating the impact score based on a result of the comparing.

7. The method of claim 5, further comprising:
   comparing one or more content descriptors of the subscriber TV or TV UI usage data with one or more content descriptors of the unavailable service description data; and
   calculating the impact score based on a result of the comparing.

8. The method of claim 1, wherein the impact score is determined based at least in part on subscriber TV or TV UI usage data, and the subscriber TV or TV UI usage data comprises subscriber TV UI usage data.

9. The method of claim 5, further comprising:
   comparing one or more timeframe or content descriptors of the subscriber TV or TV UI usage data with one or more timeframe or content descriptors of the unavailable service description data;
   determining one or more correlation values based at least in part on comparing the one or more timeframe or content descriptors of the subscriber TV or TV UI usage data with the one or more timeframe or content descriptors of the unavailable service description data; and
   calculating the impact score based at least in part on the one or more correlation values.

10. The method of claim 5, further comprising:
    comparing one or more timeframe or content descriptors of the subscriber TV or TV UI usage data with one or more timeframe or content descriptors of the unavailable service description data;

determining one or more deviation values based on comparing the one or more timeframe or content descriptors of the subscriber TV or TV UI usage data with the one or more timeframe or content descriptors of the unavailable service description data; and wherein an impacted subscriber or an impact score is determined based at least in part on the one or more deviation values.

11. The method of claim 1, further comprising:
selecting one or more importance values of subscriber TV or TV UI usage data based on unavailable service description data which are descriptive of unavailable service during the TV service outage.

12. The method of claim 1, wherein the impact score is determined based at least in part on subscriber TV or TV UI usage data, and the TV UI usage data is provided by one of a remote control of a TV system apparatus, including a set-top box and a remote control presentation in a touch screen display of mobile computing device.

13. The method of claim 1,
calculating the impact score is based at least in part on a TV UI usage pattern of key actuations of a remote control of a TV system used by the subscriber.

14. The method of claim 1, further comprising:
maintaining access to the plurality of stored importance values.

15. The method of claim 1, further comprising:
determining a stored importance value for a timeframe descriptor based on at least one of: one or more subscriber preferences or likes; one or more subscriber profile types; one or more popularity indicators; a predetermined TV usage pattern; a TV usage pattern of a sample subscriber population; and a TV usage pattern of the subscriber.

16. The method of claim 1, further comprising:
determining a stored importance value for a content descriptor based on at least one of: one or more subscriber preferences or likes; one or more ratings or rankings; one or more popularity indicators; a predetermined TV usage pattern; a TV usage pattern of a sample subscriber population; and a TV usage pattern of the subscriber.

17. A node in a service provider network comprising:
one or more processors;
a non-transitory memory; and
one or more programs stored in the non-transitory memory, which, when executed by the one or more processors, cause the node to:
identify a subscriber to the service provider network affected by a television (TV) service outage, wherein the TV service outage is identified based at least in part on anomaly exists for at least a threshold number of subscribers in a subscriber network that is communicatively coupled to the service provider network;
identify one or more timeframe descriptors or one or more content descriptors associated with a time period of or content offered during the TV service outage, wherein the one or more timeframe descriptors are indicative of one or more timeframes within the time period, and the one or more content descriptors are descriptive of the content offered during the TV service outage;
select one or more of a plurality of stored importance values that are associated with the identified one or more timeframe or content descriptors, wherein the one or more of the plurality of stored importance values associated with the one or more timeframe descriptors are calculated based on a predicted TV usage of the subscriber at the time period, and the one or more of the plurality of stored importance values associated with the one or more content descriptors indicate the content is predicted to be watched by the subscriber; and
calculate an impact score for the subscriber as a function of the one or more of the plurality of stored importance values; and
initiate a redress measure for the subscriber based on the impact score exceeding a threshold value, including:
generating a message including the redress measure determined based on the image score;
obtaining one or more close-in-time resulting actions of the subscriber as a feedback to the redress measure; and
sending the message incorporating the feedback to the subscriber via a network.

18. A non-transitory memory storing one or more programs, which, when executed by one or more processors of a node in a service provider network, cause the device node to:
identify a subscriber to the service provider network affected by a television (TV) service outage, wherein the TV service outage is identified based at least in part on anomaly exists for at least a threshold number of subscribers in a subscriber network that is communicatively coupled to the service provider network;
identify one or more timeframe descriptors or one or more content descriptors associated with a time period of or content offered during the TV service outage, wherein the one or more timeframe descriptors are indicative of one or more timeframes within the time period, and the one or more content descriptors are descriptive of the content offered during the TV service outage;
select one or more of a plurality of stored importance values that are associated with the identified one or more timeframe or content descriptors, wherein the one or more of the plurality of stored importance values associated with the one or more timeframe descriptors are calculated based on a predicted TV usage of the subscriber at the time period, and the one or more of the plurality of stored importance values associated with the one or more content descriptors indicate the content is predicted to be watched by the subscriber; and
calculate an impact score for the subscriber as a function of the one or more of the plurality of stored importance values; and
initiate a redress measure for the subscriber based on the impact score exceeding a threshold value, including:
generating a message including the redress measure determined based on the image score;
obtaining one or more close-in-time resulting actions of the subscriber as a feedback to the redress measure; and
sending the message incorporating the feedback to the subscriber via a network.

* * * * *